US012608814B2

(12) United States Patent
Zhang et al.

(10) Patent No.:  US 12,608,814 B2
(45) Date of Patent:      Apr. 21, 2026

(54) SYSTEMS AND METHODS FOR BRAIN IDENTIFIER LOCALIZATION

(71) Applicant: WUHAN UNITED IMAGING SURGICAL CO., LTD., Wuhan (CN)

(72) Inventors: Xu Zhang, Wuhan (CN); Chuanbin Ge, Wuhan (CN); Wei Fang, Wuhan (CN)

(73) Assignee: WUHAN UNITED IMAGING SURGICAL CO., LTD., Wuhan (CN)

( * ) Notice: Subject to any disclaimer, the term of this patent is extended or adjusted under 35 U.S.C. 154(b) by 274 days.

(21) Appl. No.: 18/464,247

(22) Filed: Sep. 10, 2023

(65) Prior Publication Data

US 2023/0419499 A1      Dec. 28, 2023

Related U.S. Application Data

(63) Continuation of application No. PCT/CN2022/079897, filed on Mar. 9, 2022.

(30) Foreign Application Priority Data

Mar. 10, 2021    (CN) .......................... 202110259731.8

(51) Int. Cl.
*G06T 7/11*          (2017.01)
*G06T 7/00*          (2017.01)
(52) U.S. Cl.
CPC .............. *G06T 7/11* (2017.01); *G06T 7/0012* (2013.01); *G06T 2207/10088* (2013.01); *G06T 2207/20084* (2013.01); *G06T 2207/30016* (2013.01)
(58) Field of Classification Search
CPC .... G06N 3/0455; G06N 3/0464; G06N 3/047; G06N 3/084; G06N 3/09; G06N 3/096;
(Continued)

(56) References Cited

U.S. PATENT DOCUMENTS

| | | | | |
|---|---|---|---|---|
| 2005/0119547 A1* | 6/2005 | Shastri | ................... | A61B 5/055 |
| | | | | 600/407 |
| 2006/0036152 A1* | 2/2006 | Kozel | ................... | A61B 5/372 |
| | | | | 600/410 |

(Continued)

FOREIGN PATENT DOCUMENTS

| | | |
|---|---|---|
| CN | 108010021 A | 5/2018 |
| CN | 109509177 A | 3/2019 |

(Continued)

OTHER PUBLICATIONS

Klaus A. Ganser et al. , "A deformable digital brain atlas system according to Talairach and Tournoux," Jun. 25, 2003, Medical Image Analysis 8 (2004), pp. 1-16.*

(Continued)

*Primary Examiner* — Omar S Ismail
(74) *Attorney, Agent, or Firm* — Poseidon Advanced IP LLC

(57)          ABSTRACT

Embodiments of the present disclosure provide systems and methods for brain identifier localization. The methods include obtaining an image of a brain; determining region identifier probability map(s) of the brain, landmark identifier probability map(s) of the brain, and plane identifier probability map(s) of the brain based on the image and a neural network model; determining a segmentation result of a cerebral cortex of the brain, landmark identifier(s) of the brain, and plane identifier(s) of the brain, respectively, based on the region identifier probability map(s), the landmark identifier probability map(s), and the plane identifier probability map(s); constructing a target coordinate system based on the landmark identifier(s) and the plane identifier(s); and determining landmark(s) of the cerebral cortex based on the segmentation result of the cerebral cortex, the target coordinate system, and/or the landmark identifier(s).

20 Claims, 11 Drawing Sheets

(58) Field of Classification Search

CPC . G06T 2207/10072; G06T 2207/10088; G06T 2207/20081; G06T 2207/20084; G06T 2207/30016; G06T 7/0012; G06T 7/11; G06T 7/143; Y02A 90/30

See application file for complete search history.

(56) References Cited

U.S. PATENT DOCUMENTS

| | | | | |
|---|---|---|---|---|
| 2006/0036153 | A1* | 2/2006 | Laken | A61B 5/389 |
| | | | | 600/410 |
| 2006/0270926 | A1 | 11/2006 | Hu et al. | |
| 2009/0028403 | A1* | 1/2009 | Bar-Aviv | G06T 7/0012 |
| | | | | 382/128 |
| 2014/0233826 | A1* | 8/2014 | Agaian | G06V 20/698 |
| | | | | 382/133 |
| 2014/0348408 | A1* | 11/2014 | Zhu | A61B 6/5211 |
| | | | | 378/4 |
| 2015/0045651 | A1* | 2/2015 | Crainiceanu | G01R 33/385 |
| | | | | 600/410 |
| 2016/0192889 | A1* | 7/2016 | Koutsouleris | G16H 50/70 |
| | | | | 600/410 |
| 2019/0090749 | A1* | 3/2019 | Leuthardt | G16H 30/40 |
| 2019/0148021 | A1* | 5/2019 | Styner | G06N 20/10 |
| | | | | 705/2 |
| 2019/0287292 | A1* | 9/2019 | Ceccaldi | G06N 3/092 |
| 2019/0290185 | A1* | 9/2019 | Sarma | A61B 5/369 |
| 2019/0321106 | A1* | 10/2019 | Bergman | G06N 3/09 |
| 2020/0074214 | A1* | 3/2020 | Boespflug | G06V 10/267 |
| 2020/0097076 | A1* | 3/2020 | Alcaide | G06F 3/015 |
| 2020/0118265 | A1 | 4/2020 | Igarashi | |
| 2020/0222010 | A1* | 7/2020 | Howard | G16H 50/20 |
| 2020/0357117 | A1* | 11/2020 | Lyman | G06T 7/0012 |
| 2021/0125707 | A1* | 4/2021 | Rusko | G06T 7/11 |
| 2021/0164039 | A1* | 6/2021 | Wang | C12Q 1/6874 |
| 2022/0087631 | A1* | 3/2022 | d'Esterre | A61B 6/507 |
| 2022/0115136 | A1 | 4/2022 | Fuchigami | |
| 2022/0189028 | A1* | 6/2022 | Yoo | G16H 50/50 |
| 2023/0263455 | A1* | 8/2023 | Chiang | A61B 5/055 |
| | | | | 607/2 |

FOREIGN PATENT DOCUMENTS

| | | | |
|---|---|---|---|
| CN | 109829922 | A | 5/2019 |
| CN | 109961443 | A | 7/2019 |
| CN | 111583189 | A | 8/2020 |
| CN | 111696119 | A | 9/2020 |
| CN | 111881743 | A | 11/2020 |
| CN | 111951272 | A | 11/2020 |
| CN | 112950600 | A | 6/2021 |

OTHER PUBLICATIONS

Yuan Liu et al. , "Automatic Localization of the Anterior Commissure, Posterior Commissure, and Midsagittal Plane in MRI Scans using Regression Forests," Jul. 23, 2015, IEEE Journal of Biomedical and Health Informatics, vol. 19, No. 4, Jul. 2015, pp. 1362-1372.*

Ahmet Ekin , "Feature-Based Brain Mi D-Sagittal Plan E Det ection by Ransac," Mar. 30, 2015, 14th European Signal Processing Conference (EUSIPCO 2006), Florence, Italy, Sep. 4-8, 2006, pp. 1-4.*

Wolfgang M. Pauli et al., "A high-resolution probabilistic in vivo atlas of human subcortical brain nuclei," Apr. 17, 2018, Scientific Data, 5:180063, pp. 1-4.*

Seyed Sadegh Mohseni Salehi et al., "Auto-Context Convolutional Neural Network (Auto-Net) for Brain Extraction in Magnetic Resonance Imaging," Oct. 25, 2017, IEEE Transactions on Medical Imaging, vol. 36, No. 11, Nov. 2017, pp. 2319-2328.*

David MacDonald et al.,"Automated 3-D Extraction of Inner and Outer Surfaces of Cerebral Cortex from MRI," Jun. 22, 1999, NeuroImage 12,pp. 340-353.*

Vincent Barra et al., "Automatic Segmentation of Subcortical Brain Structures in MR Images Using Information Fusion," Apr. 26, 2001, IEEE Transactions on Medical Imaging, vol. 20, No. 7, Jul. 2001, pp. 549-557.*

Ali Gholipour et al., "Brain Functional Localization: A Survey of Image Registration Techniques," Nov. 6, 2006, IEEE Transactions on Medical Imaging, vol. 26, No. 4, Apr. 2007, pp. 427-440.*

Laurent V'erard et al., "Fully Automatic Identification of AC and PC Landmarks on Brain MRI Using Scene Analysis," Feb. 17, 1997, IEEE Transactions on Medical Imaging, vol. 16, No. 5, Oct. 1997, pp. 610-615.*

Babak A. Ardekani et al., "Model-based automatic detection of the anterior and posterior commissures on MRI scans," Mar. 3, 2009, NeuroImage 46 (2009), pp. 677-681.*

Liu, Yuan et al., Automatic Localization of the Anterior Commissure, Posterior Commissure, and Midsagittal Plane in MRI Scans using Regression Forests, IEEE Journal of Biomedical and Health Informatics, 19(4): 1362-1374, 2015.

Ahmet Ekin, Feature-Based Brain Mid-Sagittal Plane Detection by Ransac, 14th European Signal Processing Conference, 2006, 4 pages.

Partial Supplementary European Search Report in European Application No. 22766321.8 mailed on Sep. 13, 2024, 14 pages.

Guilherme C. S. Ruppert et al., A New Symmetry-based Method for Mid-sagittal Plane Extraction in Neuroimages, ISBI, 285-288, 2011.

Felipe P.G. Bergo et al., Fast, Accurate and Precise Mid-sagittal Plane Location in 3D MR Images of the Brain, Conference Paper in Communications in Computer and Information Science, 2008, 15 pages.

Alexander G. Schwing et al., Reliable Extraction of the Mid-sagittal Plane in 3D Brain MRI via Hierarchical Landmark Detection, IEEE, 213-216, 2014.

Laurent Vérard et al., Fully Automatic Identification of AC and PC Landmarks on Brain MRI Using Scene Analysis, IEEE Transactions on Medical Imaging 16(5): 610-616, 1997.

Babak A. Ardekani et al., Model-based Automatic Detection of the Anterior and Posterior Commissures on MRI Scans, Neuroimage, 46: 677-682, 2009.

Liu, Yuan et al., Automatic Localization of the Anterior Commissure, Posterior Commissure, and Midsagittal Plane in MRI Scans using Regression Forests, IEEE J Biomed Health Inform, 2015, 49 pages.

Xiao, Hua et al., Implementation of Brain Atlas Refistration Based on Talairach Coordinate System, Journal of South China Normal University ( Natural Science Edition), 40-45, 2008.

Zhang, Guangcai, Research on Localization of Landmarks in T2 Weighted MR Images of Brain and Registration with Brain Atlas, Dissertation for the Doctoral Degree in Engineering of Harbin Institute of Technology, 2011, 132 pages.

Yang, Xulei et al., Automatic Detection of Anatomical Landmarks in Brain MR Scanning Using Multi-Task Deep Neural Networks, Neurocomputing, 396: 514-521, 2020.

Seyed Sadegh Mohseni Salehi et al., Auto-Context Convolutional Neural Network (Auto-Net) for Brain Extraction in Magnetic Resonance Imaging, IEEE Transactions on Medical Imaging, 36(11): 2319-2330, 2017.

International Search Report in PCT/CN2022/079897 mailed on May 17, 2022, 7 pages.

Written Opinion in PCT/CN2022/079897 mailed on May 17, 2022, 10 pages.

* cited by examiner

<u>100</u>

200

Obtaining Module
210

Probability Map
Determination Module
220

Identifier Localization
Module
230

FIG. 2

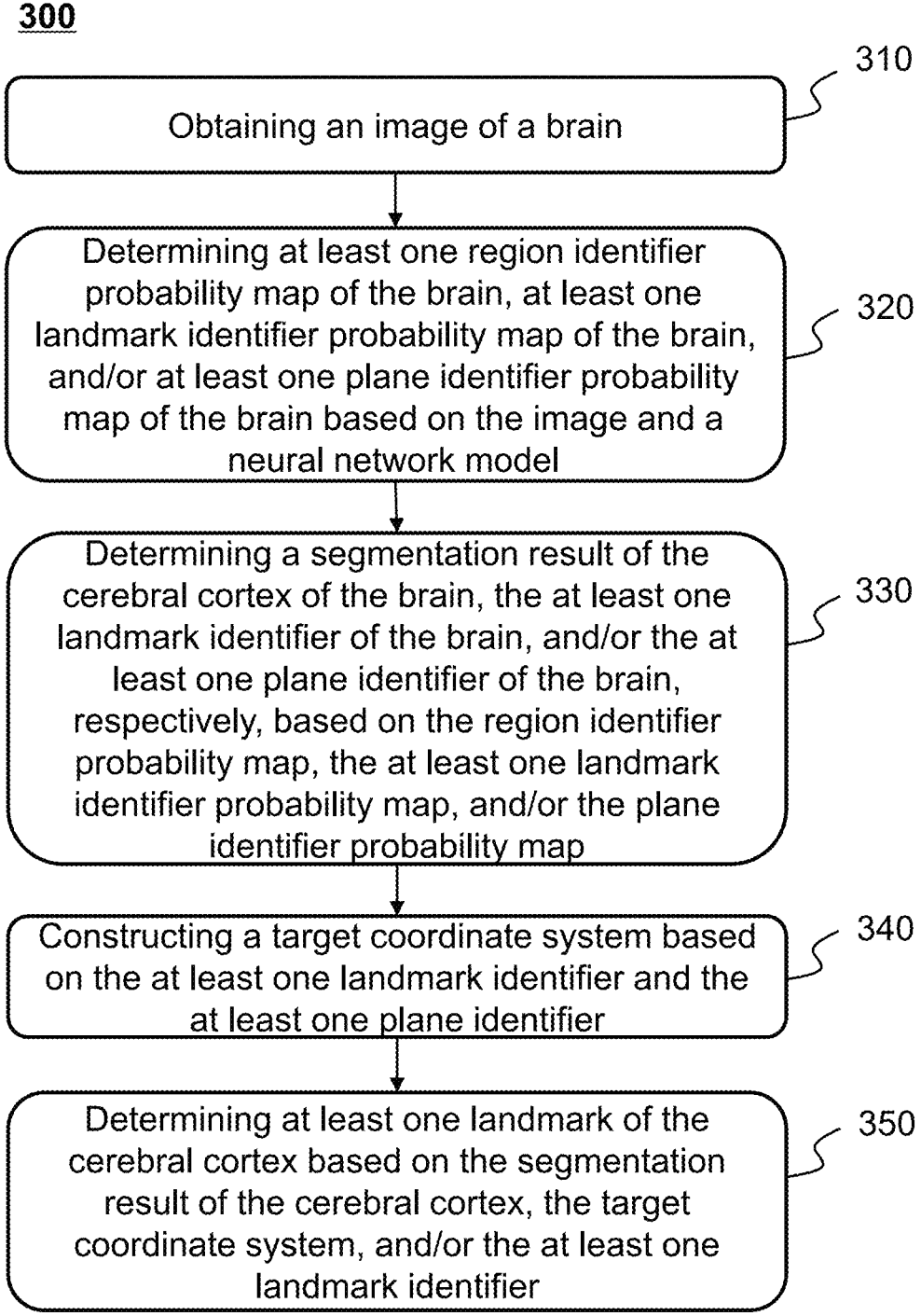

300

Obtaining an image of a brain — 310

Determining at least one region identifier probability map of the brain, at least one landmark identifier probability map of the brain, and/or at least one plane identifier probability map of the brain based on the image and a neural network model — 320

Determining a segmentation result of the cerebral cortex of the brain, the at least one landmark identifier of the brain, and/or the at least one plane identifier of the brain, respectively, based on the region identifier probability map, the at least one landmark identifier probability map, and/or the plane identifier probability map — 330

Constructing a target coordinate system based on the at least one landmark identifier and the at least one plane identifier — 340

Determining at least one landmark of the cerebral cortex based on the segmentation result of the cerebral cortex, the target coordinate system, and/or the at least one landmark identifier — 350

Figure 5:
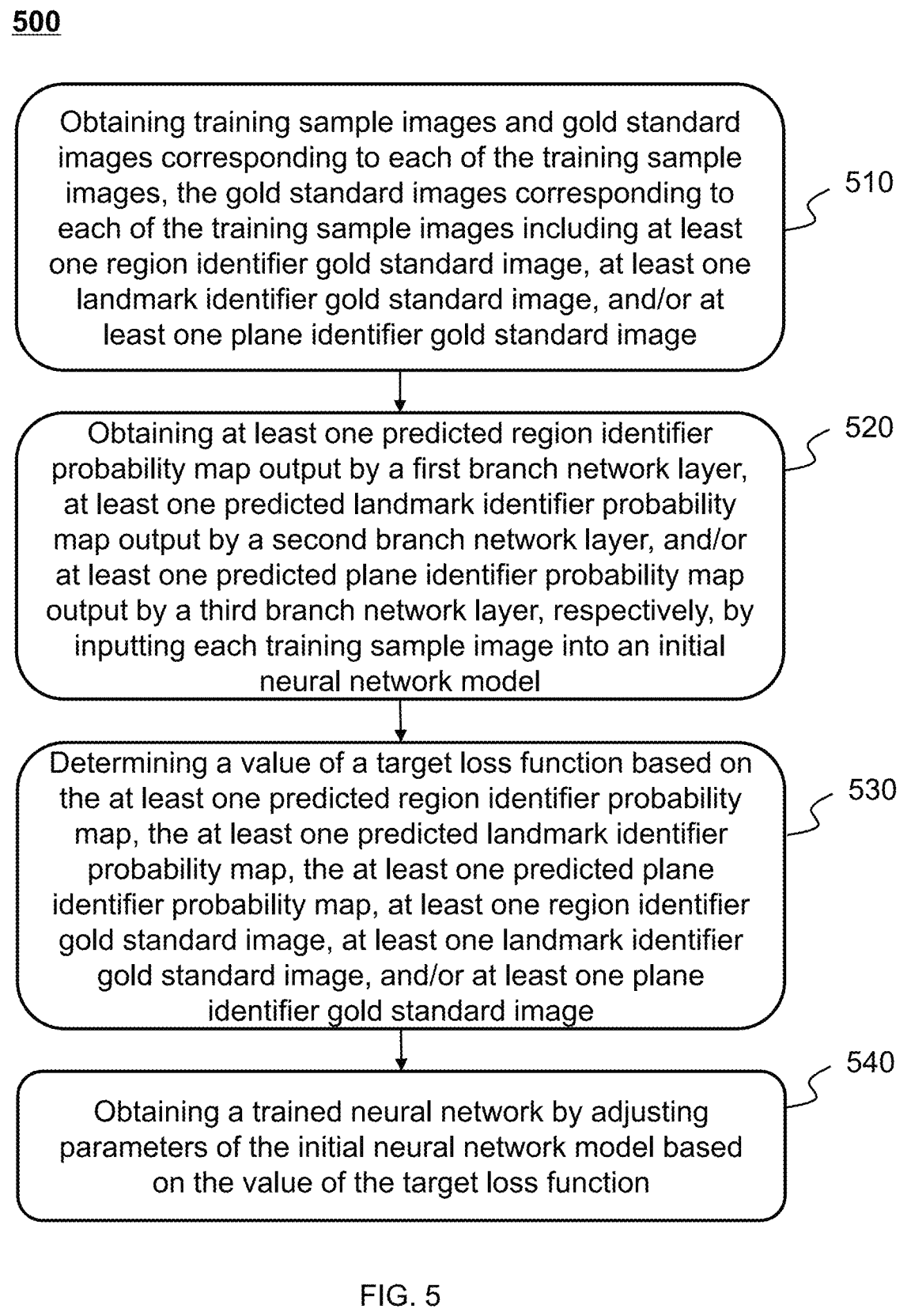

Obtaining training sample images and gold standard images corresponding to each of the training sample images, the gold standard images corresponding to each of the training sample images including at least one region identifier gold standard image, at least one landmark identifier gold standard image, and/or at least one plane identifier gold standard image — 510

Obtaining at least one predicted region identifier probability map output by a first branch network layer, at least one predicted landmark identifier probability map output by a second branch network layer, and/or at least one predicted plane identifier probability map output by a third branch network layer, respectively, by inputting each training sample image into an initial neural network model — 520

Determining a value of a target loss function based on the at least one predicted region identifier probability map, the at least one predicted landmark identifier probability map, the at least one predicted plane identifier probability map, at least one region identifier gold standard image, at least one landmark identifier gold standard image, and/or at least one plane identifier gold standard image — 530

Obtaining a trained neural network by adjusting parameters of the initial neural network model based on the value of the target loss function — 540

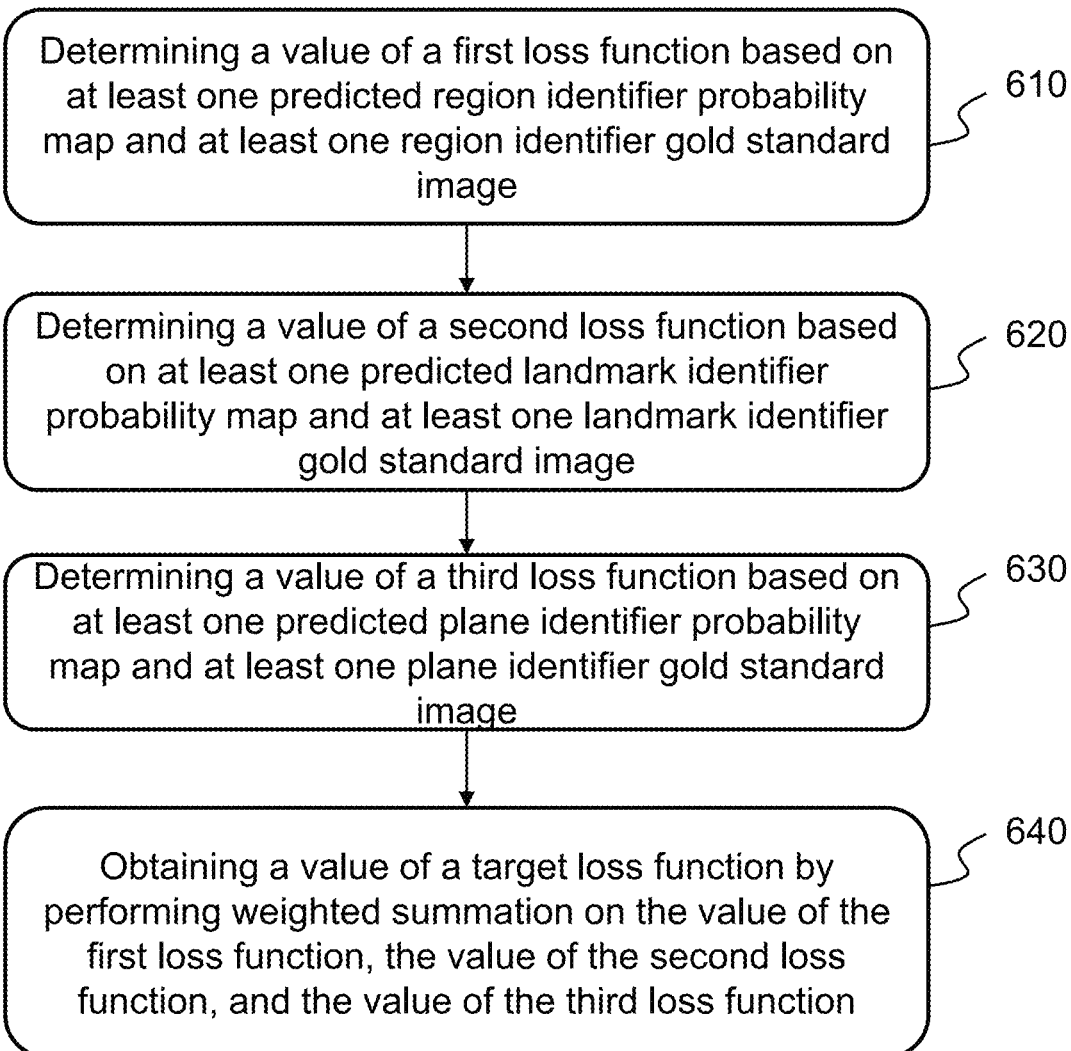

Determining a value of a first loss function based on at least one predicted region identifier probability map and at least one region identifier gold standard image — 610

Determining a value of a second loss function based on at least one predicted landmark identifier probability map and at least one landmark identifier gold standard image — 620

Determining a value of a third loss function based on at least one predicted plane identifier probability map and at least one plane identifier gold standard image — 630

Obtaining a value of a target loss function by performing weighted summation on the value of the first loss function, the value of the second loss function, and the value of the third loss function — 640

FIG. 6

Encoder

Decoder

Skip connection

Underlying connection

SYSTEMS AND METHODS FOR BRAIN IDENTIFIER LOCALIZATION

CROSS-REFERENCES TO RELATED APPLICATIONS

This application is a continuation of International Application No. PCT/CN2022/079897, filed on Mar. 9, 2022, which claims priority to Chinese Patent Application No. 202110259731.8, filed on Mar. 10, 2021, entitled "METHODS, SYSTEMS, COMPUTING DEVICES, AND STORAGE MEDIA FOR BRAIN IDENTIFIER EXTRATION," the entire contents of each of which are hereby incorporated by reference.

TECHNICAL FIELD

The present disclosure relates to the field of medical technology, and in particular, to systems and methods for brain identifier localization.

BACKGROUND

In the field of neuroscience, an anterior commissure (AC), a posterior commissure (PC), a midsagittal plane (MSP), and Talairach cerebral cortex landmarks are important brain structure identifiers. These brain structure identifiers play important roles in the field of brain anatomical imaging analysis. Performing atlas registration and mapping or establishing a brain coordinate system using these brain structure identifiers is significant for analyzing individual brain structures, locating brain functional regions, and even assisting in the localization of brain pathological regions.

In the existing software relating to neurosurgery analysis, the localization of an AC landmark, a PC landmark, the MSP, and the Talairach cortical landmarks mostly needs to be performed manually by doctors. Taking a neurosurgical robot of a Robotized Stereotactic Assistant (ROSA) system as an example, the AC, the PC, and six cortical landmarks on which the brain atlas registration function of the Talairach coordinate system depends are manually located, and the neurosurgical robot is determined accordingly. After adding an inter-hemispheric (IH) point to the MSP, the localization of the MSP can be determined by the AC landmark, the PC landmark, and the IH point. However, manual localization is time-consuming and highly influenced by the subjective operator, and has low repeatability. At present, although some automatic determination solutions have been proposed, most of the automatic determination solutions are aimed at locating a certain brain identifier. Even through a few automatic determination solutions have realized the entire determination process of the AC, the PC, the MSP, and landmarks of the cerebral cortex, the processing process is complicated, the robustness is poor, the efficiency is not high, and the practical value is low.

Therefore, it is desirable to provide systems and methods for brain identifier localization, which can automatically and accurately locate a plurality of brain identifiers.

SUMMARY

Some embodiments of the present disclosure provide a system for brain identifier localization. The system may include a processor configured to direct the system to perform operations including: obtaining an image of a brain; determining at least one region identifier probability map of the brain, at least one landmark identifier probability map of the brain, and at least one plane identifier probability map of the brain based on the image and a neural network model; determining a segmentation result of a cerebral cortex of the brain, at least one landmark identifier of the brain, and at least one plane identifier of the brain, respectively, based on the at least one region identifier probability map, the at least one landmark identifier probability map, and the at least one plane identifier probability map; constructing a target coordinate system based on the at least one landmark identifier and the at least one plane identifier; and determining at least one landmark of the cerebral cortex based on the segmentation result of the cerebral cortex, the target coordinate system, and/or the at least one landmark identifier.

Some embodiments of the present disclosure provide a method for brain identifier localization. The method may be implemented on a computing device having at least one processor and at least one storage device. The method may include obtaining an image of a brain; determining at least one region identifier probability map of the brain, at least one landmark identifier probability map of the brain, and at least one plane identifier probability map of the brain based on the image and a neural network model; determining a segmentation result of a cerebral cortex of the brain, at least one landmark identifier of the brain, and at least one plane identifier of the brain, respectively, based on the at least one region identifier probability map of the brain, the at least one landmark identifier probability map of the brain, and the at least one plane identifier probability map of the brain; constructing a target coordinate system based on the at least one landmark identifier and the at least one plane identifier; and determining at least one landmark of the cerebral cortex based on the segmentation result of the cerebral cortex, the target coordinate system, and/or the at least on landmark identifier.

Some embodiments of the present disclosure provide a system for brain identifier localization. The system may include an obtaining module configured to obtain an image of a brain; a probability map determination module configured to determine at least one region identifier probability map of the brain, at least one landmark identifier probability map of the brain, and at least one plane identifier probability map of the brain based on the image and a neural network model; and an identifier localization module configured to: determine a segmentation result of a cerebral cortex of the brain, at least one landmark identifier of the brain, and at least one plane identifier of the brain, respectively, based on the at least one region identifier probability map, the at least one landmark identifier probability map, and the at least one plane identifier probability map; construct a target coordinate system based on the at least one landmark identifier and the at least one plane identifier; and determine at least one landmark of the cerebral cortex based on the segmentation result of the cerebral cortex, the target coordinate system, and/or the at least one landmark identifier.

Some embodiments of the present disclosure provide a non-transitory computer-readable medium comprising executable instructions that, when executed by at least one processor, direct the at least one processor to perform a method. The method may include obtaining an image of a brain; determining at least one region identifier probability map of the brain, at least one landmark identifier probability map of the brain, and at least one plane identifier probability map of the brain based on the image and a neural network model; determining a segmentation result of a cerebral cortex of the brain, at least one landmark identifier of the brain, and at least one plane identifier of the brain, respectively, based on the at least one region identifier probability map of the brain, the at least one landmark identifier probability map of the brain, and the at least one plane identifier probability map of the brain; constructing a target coordinate system based on the at least one landmark identifier and the at least one plane identifier; and determining at least one landmark of the cerebral cortex based on the segmentation result of the cerebral cortex, the target coordinate system, and/or the at least on landmark identifier.

BRIEF DESCRIPTION OF THE DRAWINGS

The present disclosure is further illustrated in terms of exemplary embodiments. These exemplary embodiments are described in detail according to the drawings. These embodiments are non-limiting exemplary embodiments, in which like reference numerals represent similar structures, wherein:

FIG. 2 is a module diagram illustrating an exemplary system for identifier localization according to some embodiments of the present disclosure;

FIG. 3 is a flowchart illustrating an exemplary process for identifier localization according to some embodiments of the present disclosure;

FIG. 5 is a flowchart illustrating an exemplary process for training a neural network model according to some embodiments of the present disclosure;

FIG. 6 is a flowchart illustrating an exemplary process for training a neural network model according to some embodiments of the present disclosure;

DETAILED DESCRIPTION

Figure 1:
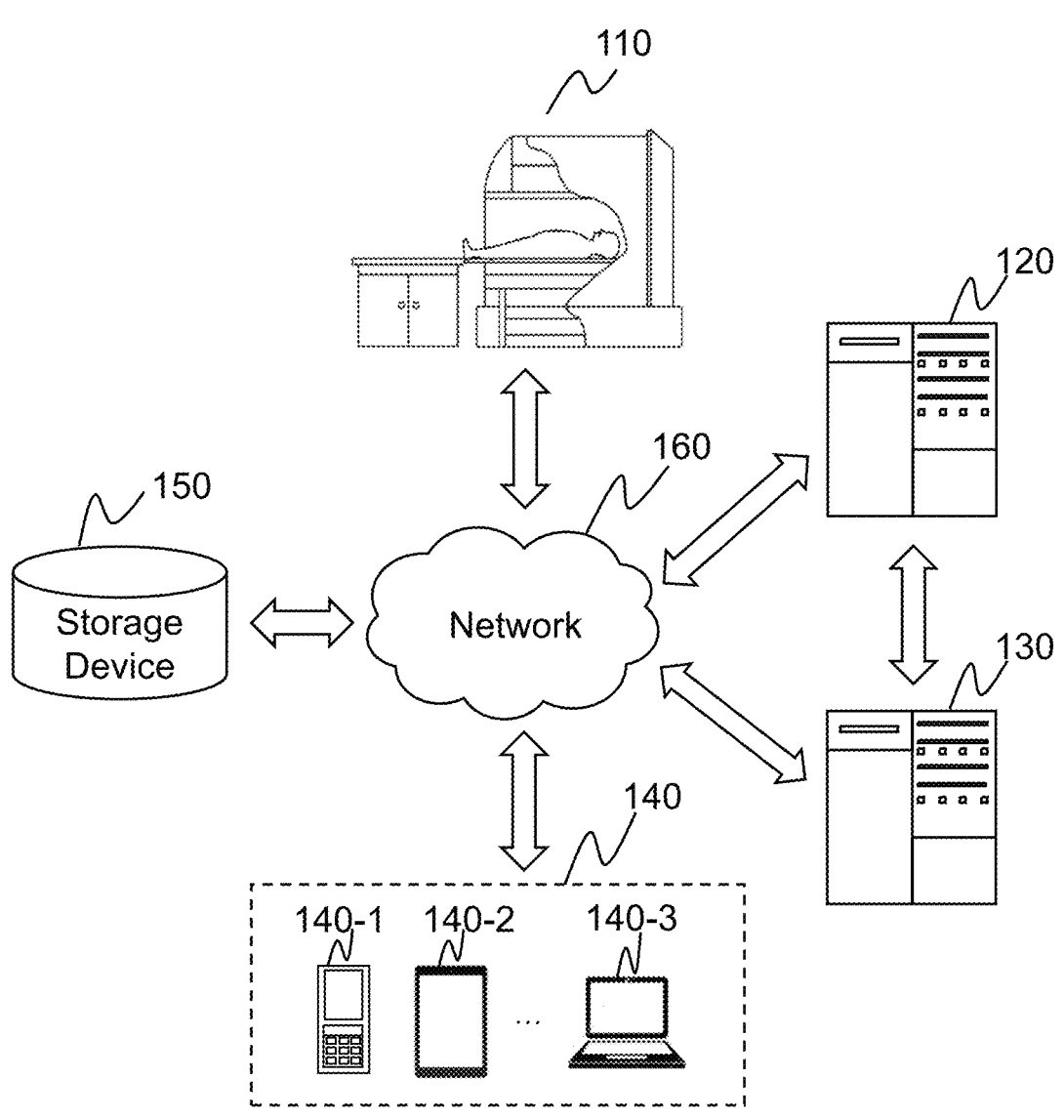
FIG. 1 is a schematic diagram illustrating an application scenario of a system for identifier localization according to some embodiments of the present disclosure.

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system," "device," "unit," and/or "module" as used herein is a manner used to distinguish different components, elements, parts, sections, or assemblies at different levels. However, if other words serve the same purpose, the words may be replaced by other expressions.

As shown in the present disclosure and claims, the words "one," "a," "a kind," and/or "the" are not especially singular but may include the plural unless the context expressly suggests otherwise. In general, the terms "comprise," "comprises," "comprising," "include," "includes," and/or "including," merely prompt to include operations and elements that have been clearly identified, and these operations and elements do not constitute an exclusive listing. The methods or devices may also include other operations or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

In some application scenarios, the system for identifier localization (e.g., the system for brain identifier localization) may include a computing device and a user terminal. The system for identifier localization may determine at least one landmark identifier, at least one plane identifier, at least one region identifier, and other identifier localization results through the computing device, etc., so as to obtain feature information of a specific part (e.g., a brain), such as Talairach cortical landmarks, thereby reducing the workload of landmark determination, simplifying the workflow for doctors, and improving the accuracy of the localization and segmentation of the human body structure.

FIG. 1 is a schematic diagram illustrating an application scenario of a system for identifier localization according to some embodiments of the present disclosure.

As shown in FIG. 1, in some embodiments, a system 100 for identifier localization (e.g., a system for brain identifier localization) may include a medical imaging device 110, a first computing device 120, a second computing device 130, a user terminal 140, a storage device 150, and a network 160.

The medical imaging device 110 refers to a device that reproduces an internal structure of a target subject (e.g., a human body) as an image by using different media. In some embodiments, the medical imaging device 110 may be any device capable of imaging or treating a specific body part of the target subject (e.g., the human body), such as a magnetic resonance imaging (MRI) device, a computed tomography (CT) device, a positron emission tomography (PET) device, or the like. The medical imaging device 110 provided above is merely for illustration purposes, and is not intended to limit the scope of the present disclosure. In some embodiments, the medical imaging device 110 may obtain a medical image (e.g., an MRI image, a CT image, etc.) of the specific body part (e.g., a brain) of a patient, and transmit the medical image to other components (e.g., the first computing device 120, the second computing device 130, and the storage device 150) of the system 100. In some embodiments, the medical imaging device 110 may perform data and/or information exchange with other components of the system 100 through the network 160.

Each of the first computing device 120 and the second computing device 130 refers to a system with computing and processing capability, and may include various computers, such as a server, a personal computer, etc. Each of the first computing device 120 and the second computing device 130 may also be a computing platform composed of a plurality of computers connected in various structures. In some embodiments, each of the first computing device 120 and the second computing device 130 may be implemented on a cloud platform. For example, the cloud platform may include a private cloud, a public cloud, a hybrid cloud, a community cloud, a distributed cloud, a cross-cloud, a multi-cloud, or the like, or any combination thereof. In some embodiments, the first computing device 120 and the second computing device 130 may be a same device or different devices.

Each of the first computing device 120 and the second computing device 130 may include one or more sub-processing devices (e.g., a single-core processing device or a multi-core processing device), and may execute program instructions. Merely by way of example, each of the first computing device 120 and the second computing device 130 may include various common devices, such as, a general-purpose central processing unit (CPU), a graphics processing unit (GPU), a microprocessor, an application-specific integrated circuit (ASIC), or any other types of integrated circuits.

The first computing device 120 may process information and data related to the medical image. In some embodiments, the first computing device 120 may execute the method for brain identifier localization according to some embodiments of the present disclosure to obtain at least one brain identifier localization result, such as Talairach cortex landmarks, etc. In some embodiments, the first computing device 120 may include a neural network model, and the first computing device 120 may obtain at least one identifier probability map of the brain through the neural network model. In some embodiments, the first computing device 120 may obtain a trained neural network model from the second computing device 130. In some embodiments, the first computing device 120 may determine the at least one brain identifier localization result based on the at least one identifier probability map of the brain. In some embodiments, the first computing device 120 may perform information and/or data exchange with other components (e.g., the medical imaging device 110, the second computing device 130, the user terminal 140, and the storage device 150) of the system 100 through the network 160. In some embodiments, the first computing device 120 may be directly connected with the second computing device 130 and perform information and/or data exchange with the second computing device 130.

The second computing device 130 may be used for model training. In some embodiments, the second computing device 130 may obtain the trained neural network model by implementing a method for training a neural network model according to some embodiments of the present disclosure. In some embodiments, the second computing device 130 may obtain training sample images and gold standard images corresponding to the training sample images for training the neural network model. In some embodiments, the second computing device 130 may obtain image information from the medical imaging device 110 as training data of the neural network model. In some embodiments, the first computing device 120 and the second computing device 130 may also be a same computing device.

The user terminal 140 may receive and/or display a processing result of the medical image. In some embodiments, the user terminal 140 may receive the at least one brain identifier localization result of the medical image from the first computing device 120, and perform diagnosis and treatment for a patient based on the at least one brain identifier localization result. In some embodiments, the user terminal 140 may direct the first computing device 120 to execute the method for brain identifier localization according to some embodiments of the present disclosure through instruction(s). In some embodiments, the user terminal 140 may control the medical imaging device 110 to obtain the medical image of the specific part. In some embodiments, the user terminal 140 may be one or any combination of a mobile device 140-1, a tablet computer 140-2, a laptop computer 140-3, a desktop computer, and other devices with input and/or output functions.

The storage device 150 may store data or information generated by other devices of the system 100. In some embodiments, the storage device 150 may store the medical image captured by the medical imaging device 110. In some embodiments, the storage device 150 may store data and/or information processed by the first computing device 120 and/or the second computing device 130, such as the at least one identifier probability map of the brain, the at least one brain identifier localization result, etc. The storage device 150 may include one or more storage components, and each of the one or more storage components may be an independent device or a portion of other devices of the system 100. The storage device 150 may be local or may be implemented via the cloud.

The network 160 may connect various components of the system 100 and/or connect the system 100 with external resources. The network 160 may enable communications between the various components and communications between the various components and other components outside the system 100 to facilitate data and/or information exchange. In some embodiments, one or more components (e.g., the medical imaging device 110, the first computing device 120, the second computing device 130, the user terminal 140, and the storage device 150) of the system 100 may send the data and/or information to other components through the network 160. In some embodiments, the network 160 may be any one or more of a wired network or a wireless network.

It should be noted that the descriptions are provided for the purposes of illustration, and are not intended to limit the scope of the present disclosure. For persons having ordinary skills in the art, various variations and modifications may be conducted under the teaching of the present disclosure. The features, structures, methods, and other features of the exemplary embodiments described in the present disclosure can be combined in various manners to obtain additional and/or alternative exemplary embodiments. For example, the first computing device 120 and/or the second computing device 130 may be run based on a cloud computing platform, such as a public cloud, a private cloud, a community cloud, a hybrid cloud, or the like. However, these changes and modifications do not depart from the scope of the present disclosure.

Figure 2:
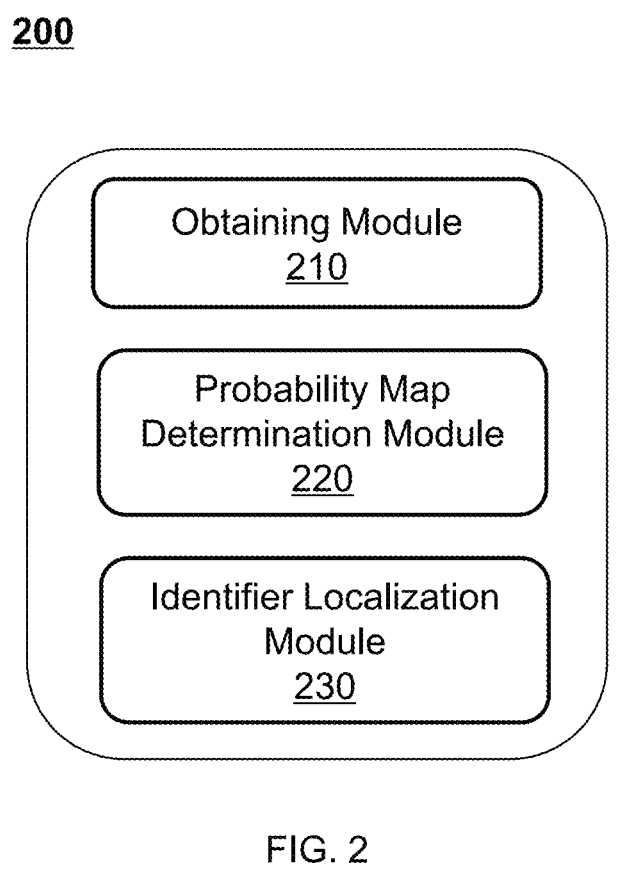

FIG. 2 is a block diagram illustrating an exemplary system 200 for identifier localization according to some embodiments of the present disclosure.

As shown in FIG. 2, in some embodiments, the system 200 for identifier localization (e.g., a system for brain identifier localization) may include an obtaining module 210, a probability map determination module 220, and an identifier localization module 230.

In some embodiments, the obtaining module 210 may be configured to obtain an image of a brain.

In some embodiments, the image of the brain may include an MRI image, etc.

In some embodiments, the probability map determination module 220 may be configured to determine at least one region identifier probability map of the brain, at least one landmark identifier probability map of the brain, and/or at least one plane identifier probability map of the brain based on the obtained image of the brain and the neural network model.

In some embodiments, the neural network model may be a multi-task model. In some embodiments, the neural network model may include a shared network layer and/or at least two (e.g., three) branch network layers. In some embodiments, the branch network layers may include a first branch network layer, a second branch network layer, and/or a third branch network layer. The first branch network layer may be configured to segment the brain, and output the at least one region identifier probability map; the second branch network layer may be configured to locate the at least one landmark identifier of the brain, and output the at least one landmark identifier probability map; and the third branch network layer may be configured to locate the at least one plane identifier of the brain, and output the at least one plane identifier probability map.

In some embodiments, the identifier localization module 230 may be configured to determine a segmentation result of a cerebral cortex of the brain, at least one landmark identifier of the brain, and/or at least one plane identifier of the brain, respectively, based on the at least one region identifier probability map, the at least one landmark identifier probability map, and/or the at least one identifier probability map; construct a target coordinate system based on the at least one landmark identifier and the at least one plane identifier; and/or determine at least one landmark of the cerebral cortex based on the segmentation result of a target region, the target coordinate system, and/or the at least one landmark identifier.

In some embodiments, the at least one landmark identifier probability map may include an anterior commissure (AC) probability map and/or a posterior commissure (PC) probability map, and the at least one landmark identifier may include an AP landmark and/or a PC landmark.

In some embodiments, the identifier localization module 230 may determine a position of a pixel point corresponding to a maximum probability value in the at least one landmark identifier probability map as a position of a landmark identifier.

In some embodiments, the at least one plane identifier probability map may include an MSP probability map, and the plane identifier may include an MSP.

In some embodiments, for each of the at least one plane identifier probability map, the identifier localization module 230 may determine a target point set based on the plane identifier probability map. In some embodiments, for each of the at least one plane identifier probability map, the identifier localization module 230 may determine a set of pixel points in the plane identifier probability map as the target point set, a probability of each of the set of pixel points being larger than a preset threshold.

In some embodiments, for each of the at least one plane identifier probability map, the identifier localization module 230 may obtain the plane identifier by fitting the target point set. In some embodiments, for each of the at least one plane identifier probability map, the identifier localization module 230 may obtain the plane identifier by fitting the target point set based on a random sampling consensus (RANSAC) algorithm.

In some embodiments, the at least one landmark of the cerebral cortex may include at least one of a frontmost point of the cerebral cortex, a rearmost point of the cerebral cortex, a leftmost point of the cerebral cortex, a rightmost point of the cerebral cortex, an inferior point of the cerebral cortex, and a superior point of the cerebral cortex.

In some embodiments, the identifier localization module 230 may determine the at least one landmark of the cerebral cortex based on a maximum point or a minimum point of the cerebral cortex along one direction of three coordinate axes of the target coordinate system; and/or determine a maximum point or a minimum point of the cerebral cortex that passes through the at least one landmark identifier and is parallel to one direction of three coordinate axes of the target coordinate system as the at least one landmark of the cerebral cortex.

In some embodiments, the identifier localization system 200 may further include a model training module (not shown in FIG. 2). The model training module may be configured to train the neural network model.

In some embodiments, the obtaining module 210 and/or the model training module may obtain training sample images and gold standard images corresponding to each of the training sample images, and the gold standard images corresponding to each of the training sample images may include at least one region identifier gold standard image, at least one landmark identifier gold standard image, and/or at least one plane identifier gold standard image.

In some embodiments, for each of the training sample images, the probability map determination module 220 and/or the model training module may obtain at least one predicted region identifier probability map output from the first branch network layer, at least one predicted landmark identifier probability map output from the second branch network layer, and/or at least one predicted plane identifier probability map output from the third branch network layer, respectively, by inputting the training sample image into an initial neural network model.

In some embodiments, the model training module may determine a value of a target loss function based on the at least one predicted region identifier probability map, the at least one predicted landmark identifier probability map, the at least one predicted plane identifier probability map, the at least one region identifier gold standard images, the at least one landmark identifier gold standard images, and/or the at least one plane identifier gold standard images.

In some embodiments, the model training module may obtain a trained neural network model by adjusting parameters of the initial neural network model based on the value of the target loss function.

In some embodiments, the model training module may be configured on a computing device different from other modules (e.g., the obtaining module 210, the probability map determination module 220, and the identifier localization module 230). For example, the model training module may be configured on the second computing device 130, while other modules may be configured on the first computing device 120.

FIG. 3 is a flowchart illustrating an exemplary process 300 for identifier localization according to some embodiments of the present disclosure.

As shown in FIG. 3, the process 300 may include one or more operations of the following operations. In some embodiments, the process 300 may be performed by the first computing device 120.

In 310, an image of a brain may be obtained. In some embodiments, operation 310 may be performed by the obtaining module 210.

The image of the brain refers to a medical image of the brain of a target subject, such as, an MRI image, a CT image, or the like. The target subject may include various organisms, such as, a human body, a small animal, etc. In some embodiments, the image of the brain may include a brain MRI image (e.g., T1, T2, T2 FLAIR, etc.). In some embodiments, the image of the brain may include at least one of a two-dimensional (2D) image, a three-dimensional (3D) image, or the like.

In some embodiments, the image (e.g., an MRI image 410 illustrated in FIG. 4) of the brain may be obtained by scanning the brain of the target subject using a medical imaging device (e.g., an MRI device, a CT device, etc.).

In 320, at least one region identifier probability map of the brain, at least one landmark identifier probability map of the brain, and/or at least one plane identifier probability map of the brain may be determined based on the image and a neural network model. In some embodiments, operation 320 may be performed by the probability map determination module 220.

An identifier refers to a specific anatomical structure or position of various types of biological organs/tissues. The identifier may include a plurality of types, such as, a landmark identifier, a plane identifier, a region identifier, etc. A landmark identifier may be configured to localize an anatomical landmark, e.g., an AC landmark, a PC landmark, etc., of the brain. A plane identifier may be configured to localize an anatomical plane, e.g., an MSP of the brain, etc. A region identifier may be used for identifying and segmenting a region, e.g., segmenting a cerebral cortex, etc. An identifier probability map represents a probability that each part in the medical image is a certain type of identifier, and the identifier probability map may be a medical image marked with probability values. Corresponding to the identifier, the identifier probability map may include various types, e.g., the landmark identifier probability map, the plane identifier probability map, the region identifier probability map, etc. In some embodiments, the identifier probability map may correspond to the image of the brain, and include at least one of the 2D image, the 3D image, or the like.

In some embodiments, the identifier probability map may include one or more of the region identifier probability map, the landmark identifier probability map, and the plane identifier probability map of a specific part (e.g., a brain, etc.). In some embodiments, the identifier may be brain identifiers, and may include at least one landmark identifier, at least one plane identifier, at least one region identifier, and other identifiers of the brain. In some embodiments, other identifiers of the brain may include at least one landmark of a cerebral cortex, a brain coordinate system, etc.

In some embodiments, the at least one landmark identifier of the brain may also include one or more of a midbrain-pons junction (MPJ) point on the MSP, a bifurcation point of an intracranial blood vessel that is used for an extraction of a blood vessel, at least one intersection point of structures (e.g., ventricle, corpus callosum, pons, etc.) that is used for posture correction of the brain, alignment of the brain with a template, etc., and a bifurcation point of a cerebral sulci that is used for morphological analysis of the brain. In some embodiments, the above identifiers may be obtained through the at least one landmark identifier probability map.

Figure 4:
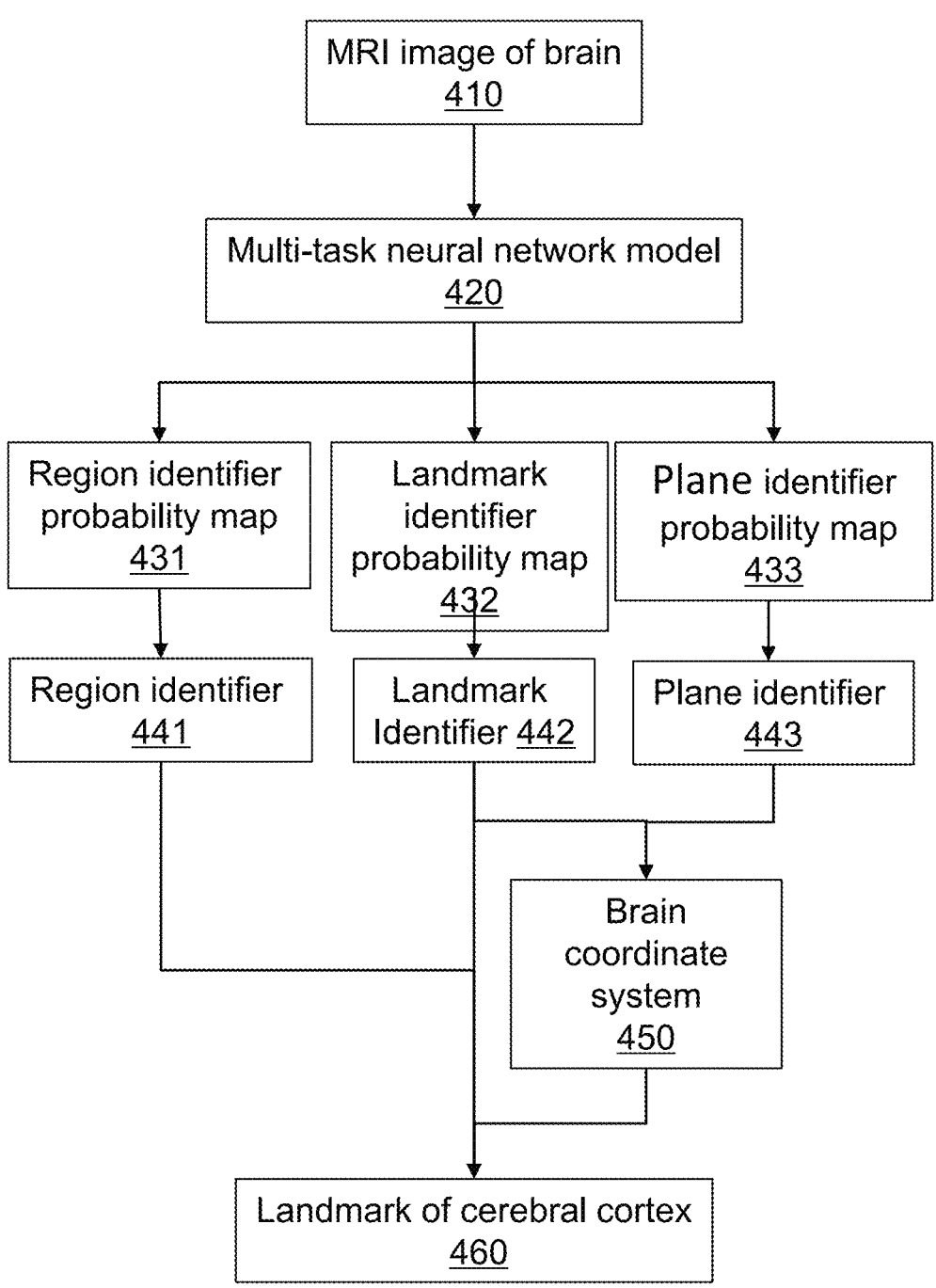
FIG. 4 is a schematic diagram illustrating a process for brain identifier determination using a neural network model according to some embodiments of the present disclosure.

In some embodiments, one or more types of identifier probability maps (e.g., the regional probability map, the landmark identifier probability map, the plane identifier probability map, etc.) of the brain may be obtained by inputting one or more brain images into the neural network model. As shown in FIG. 4, at least one region identifier probability map 431, at least one landmark identifier probability map 432, and at least one plane identifier probability map 433 may be obtained by inputting an MRI image 410 of the brain into a multi-task neural network model 420.

In some embodiments, the neural network model may output all the required identifier probability maps (e.g., the at least one region identifier probability map, the at least one landmark identifier probability map, and the at least one plane identifier probability map) at one time, so as to obtain all identifiers (including the at least one region identifier, the at least one landmark identifier, the at least one plane identifier, etc.) for subsequent operations (e.g., establishing a brain coordinate system, determining the at least one landmark of the cerebral cortex, etc.).

In some embodiments, the neural network model may independently output the at least one region identifier probability map, the at least one landmark identifier probability map, the at least one plane identifier probability map, etc., so as to obtain the at least one region identifier, the at least one landmark identifier, the at least one plane identifier, etc., respectively.

In some embodiments, the neural network model may be a pre-trained neural network model for extracting at least one identifier probability map of a specific part from an image of the specific part (e.g., an MRI image of the brain of a human body). For example, the pre-trained neural network model may include a convolution neural networks (CNN) model, a fully convolutional networks (FCN) model, etc. In some embodiments, the neural network model may be the FCN model, and a network structure of the neural network model may be any type of the FCN model, e.g., a U-Net model, a V-Net model, a semantic segmentation network (SegNet), or the like. In some embodiments, the neural network model may be a multi-task FCN model with an encoder-decoder structure.

In some embodiments, the neural network model may be a multi-task model, and the multi-task model may include a shared network layer and at least two branch network layers. Parameters of the shared network layer may be shared in different tasks, while the branch network layers may correspond to different tasks, and parameters of the branch network layers may be different.

In some embodiments, a count of the branch network layers may be determined based on a count of the types of identifier probability maps that the neural network model needs to output. For example, the count of the branch network layers may be the same as the count of the types of identifier probability maps. In some embodiments, each type of identifier may correspond to a task branch, so that different types of identifier probability maps may be output through different branch network layers of the neural network model, respectively. For example, the at least one landmark identifier probability map may be output through a landmark identifier task branch network layer of the neural network model, the at least one plane identifier probability map may be output through a plane identifier task branch network layer of the neural network model, and the at least one region identifier probability map may be output through a region identifier task branch network layer of the neural network model layer. As shown in FIG. 4, the multi-task neural network model 420 may include three task branches corresponding to brain segmentation, anatomical landmark localization, and anatomical plane localization, respectively, and outputs of the three task branches may be the at least one region identifier probability map 431, the at least one landmark identifier probability map 432, and the at least one plane identifier probability map 433, respectively.

In some embodiments, the branch network layers of the neural network model may include three branch network layers, i.e., a first branch network layer, a second branch network layer, and a third branch network layer.

Taking the specific part being the brain as an example, in some embodiments, the first branch network layer may be configured to segment the brain, and output the at least one region identifier probability map. The second branch network layer may be configured to locate the at least one landmark identifier (e.g., the AC landmark, the PC landmark, etc.) of the brain, and output the at least one landmark identifier probability map. The third branch network layer may be configured to locate the at least one plane identifier (e.g., the MSP, etc.) of the brain, and output the at least one plane identifier probability map, wherein the at least one plane identifier may correspond to all pixel points on a localization plane.

In some embodiments, the first branch network layer may be a branch network layer corresponding to a region identifier task of the specific part (e.g., the brain, etc.), and the output of the first branch network layer may be the at least one region identifier probability map of the specific part. A value of each pixel point in the at least one region identifier probability map may represent a probability value that the pixel point belongs to the region identifier of the specific part. For example, the at least one region identifier may include a parenchymal segmentation region of the brain, a value of each pixel point in a probability map of the parenchymal segmentation region of the brain may represent a probability value that the pixel point is a point on the brain parenchyma.

The second branch network layer may be a branch network layer corresponding to a landmark identifier (e.g., the AC landmark, the PC landmark, etc.) task of the specific part, and the output of the second branch network layer may be the at least one landmark identifier probability map of the specific part. A value of each pixel point in the at least one landmark identifier probability map may represent a probability value that the pixel point is a landmark identifier of the specific part. For example, a value of each pixel point in the AC probability map may represent a probability value that the pixel point is an AC landmark, and a value of each pixel point in the PC probability map may represent a probability value that the pixel point is a PC landmark.

The third branch network layer may be a branch network layer corresponding to a plane identifier (e.g., the MSP, etc.) task of the specific part, and an output of the third branch network layer may be the at least one plane identifier probability map of the specific part. A value of each pixel point in the at least one plane identifier probability map may represent a probability value that the pixel point belongs to the plane identifier of the specific part. For example, the at least one plane identifier may include the MSP, and a value of each pixel point in the MSP probability map may represent a probability value that the pixel point is a point on the MSP.

In some embodiments, the trained neural network model may be obtained by training an initial neural network model based on training sample images and gold standard images corresponding to the training sample images. More descriptions regarding the training of the neural network model may be found in FIG. 5 and relevant descriptions thereof, which are not repeated herein.

In 330, a segmentation result of a cerebral cortex of the brain, the at least one landmark identifier of the brain, and/or the at least one plane identifier of the brain may be determined, respectively, based on the at least one region identifier probability map, the at least one landmark identifier probability map, and/or the at least one plane identifier probability map. In some embodiments, operation 330 may be performed by the identifier localization module 230.

An identifier localization result includes information relating to an identifier of a biological organ/tissue, e.g., the at least one landmark identifier, the at least one plane identifier, the at least one region identifier, the brain coordinate system, the at least one landmark of the cerebral cortex, etc. In some embodiments, the identifier localization result of the specific part may be determined based on the identifier probability map (e.g., the at least one region identifier probability map, the at least one landmark identifier probability map, the at least one plane identifier probability map, etc.) of the specific part. In some embodiments, the at least one region identifier may include a segmentation result of the specific region, e.g., the segmentation result of the cerebral cortex, etc.

In some embodiments, the at least one landmark identifier of the specific part (e.g., the brain, etc.) may be determined based on the at least one landmark identifier probability map obtained in operation 320. For example, a specific position of the AC landmark may be determined from the AC probability map, and a specific position of the PC landmark may be determined from the PC probability map. As shown in FIG. 4, at least one landmark identifier 442 may be determined based on the at least one landmark identifier probability map 432.

In some embodiments, the at least one landmark identifier probability map may include the AC probability map and the PC probability map, and the at least one landmark identifier may include the AC landmark and the PC landmark.

In some embodiments, a localization of a key point may be performed by determining the at least one landmark identifier of the specific part, and the at least one landmark identifier may be used as the key point. In some embodiments, the at least one landmark identifier may also include other key points of the brain. In the medical field, the landmark localization is widely used in the intelligence of workflow, intermediate steps of automatic algorithms, etc. For example, point pair registration of a plurality of images, spatial registration between images and physical objects, etc., may be performed by locating certain key point pairs. Merely by way of example, in the application of cerebrovascular segmentation, a start position of a blood vessel is usually localized for a growth of the blood vessel. In this case, a key point of the start position of the blood vessel may be determined through the at least one landmark identifier probability map.

Figure 10:
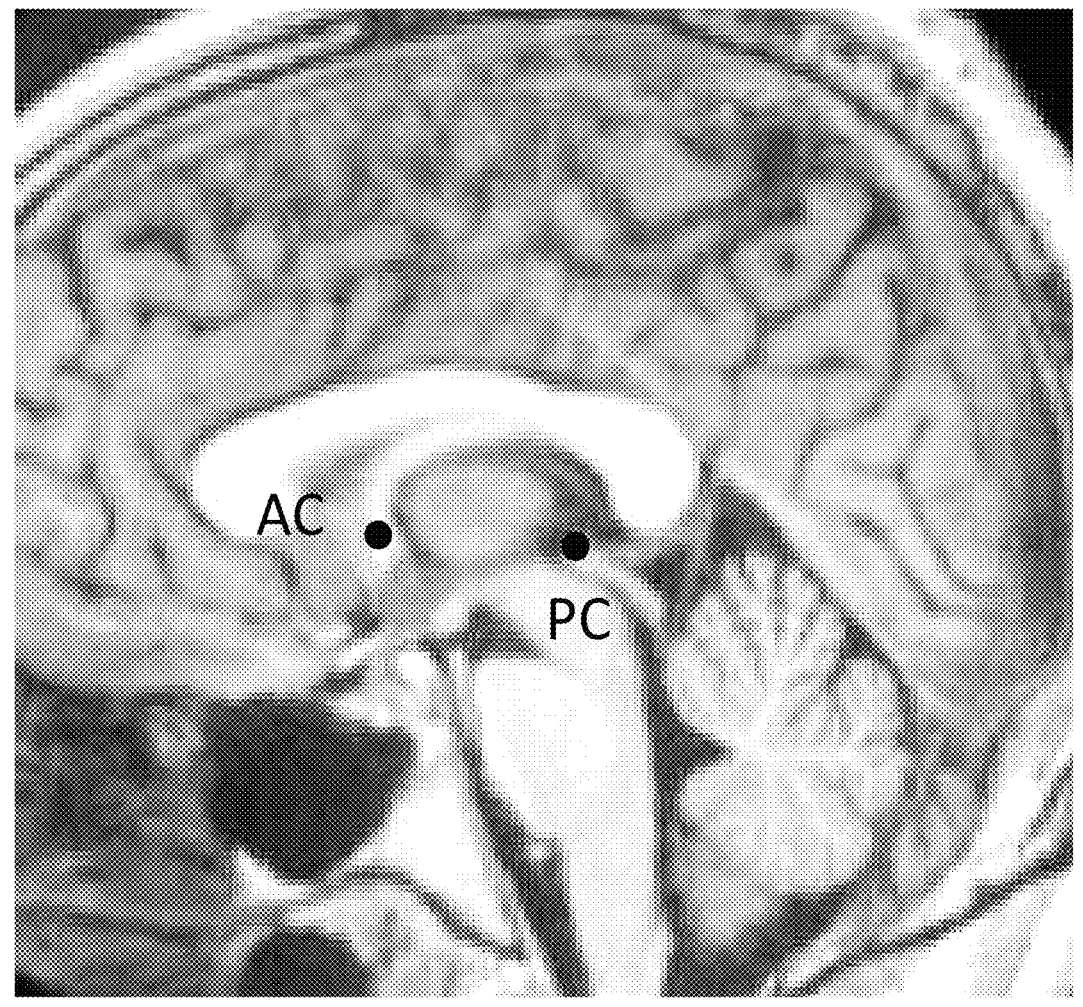
FIG. 10 is a schematic diagram illustrating an AC landmark and a PC landmark according to some embodiments of the present disclosure.

In some embodiments, for each of the at least one landmark identifier probability map, a position of a pixel point corresponding to a maximum probability value in the landmark identifier probability map may be determined as a position of the landmark identifier. For instance, a coordinate position of a pixel point corresponding to a maximum probability value in the AC probability map may be determined, and a location coordinate of the pixel point corresponding to the maximum probability value may be determined as a location coordinate of the AC landmark. Similarly, a coordinate position of a pixel point corresponding to a maximum probability value in the PC probability map may be determined, and a location coordinate of the pixel point corresponding to the maximum probability value may be determined as a location coordinate of the PC landmark. It should be noted that the coordinate location herein refers to row-column-layer coordinates (i, j, l) in the probability map, wherein i represents a row, j represents a column, and l represents a layer. As shown in FIG. 10, a point AC and a point PC represent the AC landmark and the PC landmark, respectively.

Due to a small size of an anatomical structure and the interference of anatomical structures with similar gray levels around the anatomical structure, it is often difficult to directly localize the AC landmark and the PC landmark. Therefore, the determination of the AC landmark and the PC landmark may generally depend on the prior localization of other structures. For example, a region of interest (ROI) containing a corpus callosum may be determined based on the anatomical knowledge, anatomical structures (e.g., the corpus callosum, a fornix, and a brainstem) may be determined by segmenting the ROI, and locations of the AC landmark and the PC landmark may be determined based on a spatial relationship between the AC landmark and the anatomical structures and a spatial relationship between the PC landmark and the anatomical structures. Alternatively, a model of a relationship among three landmarks may be obtained based on an image of the AC landmark, the PC landmark, and an apex of a superior pontine sulcus manually marked on the MSP image, and the locations of the AC landmark and the PC landmark may be determined using the model through the apex of the superior pontine sulcus. However, either manner has a complicated process, which can lead to a detection error of surrounding structures, thereby amplifying the error of the AC landmark and the PC landmark.

According to some embodiments of the present disclosure, a method for determining the AC landmark and the PC landmark is provided. The method may obtain the AC probability map and the PC probability map through the preset neural network model, and then determine the AC landmark and the PC landmark based on the AC probability map and the PC probability map, which can efficiently and accurately determine the AC landmark and the PC landmark of the brain without relying on the prior localization of other structures or manual landmark determination.

In some embodiments, the at least one plane identifier of the specific part may be determined based on the at least one plane identifier probability map of the specific part. For example, the specific position of the MSP may be determined from the at least one plane identifier probability map. As shown in FIG. 4, at least one plane identifier 443 may be determined based on the at least one plane identifier probability map 433.

Figure 11:
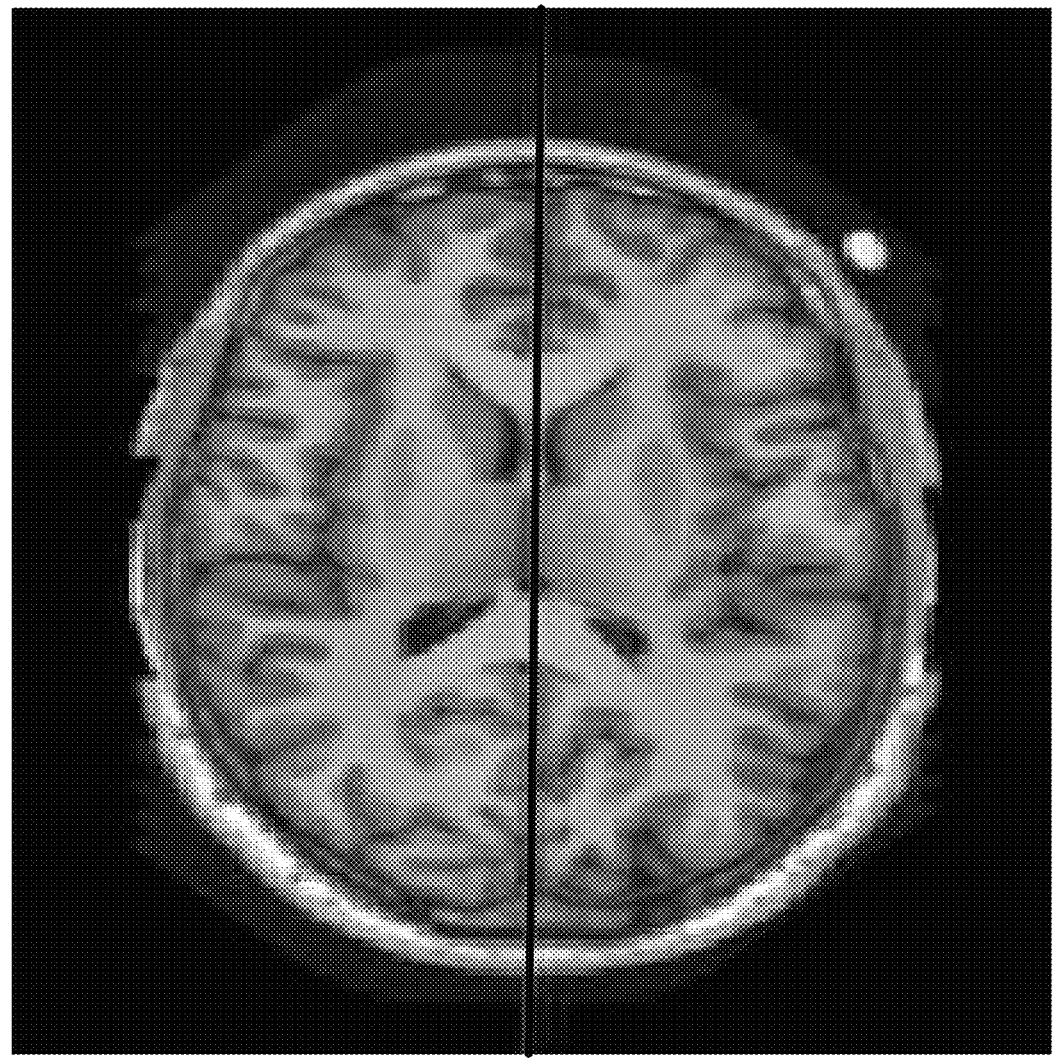
FIG. 11 is a schematic diagram illustrating an MSP according to some embodiments of the present disclosure.

In some embodiments, the at least one plane identifier probability map may include the MSP probability map, and the plane identifier may include the MSP. FIG. 11 is a schematic diagram illustrating a determined MSP according to some embodiments of the present disclosure.

A cerebral fissure is an important anatomical identifier of the brain. A virtual plane, which makes left and right hemispheres of the human brain symmetrical with respect to the cerebral fissure, exists within a range of the cerebral fissure. The plane is referred to as the MSP. The anatomical tissues of the brain on both sides of the MSP may be approximately symmetrical with respect to the MSP.

In some embodiments, the plane localization of the brain may be performed by determining the at least one plane identifier of the brain, which mainly focuses on the localization of the MSP. The localization of the MSP may be applied to a plurality of scenarios. The MSP refers to a symmetrical plane of the brain. After the MSP is localized, the brain may be easily divided into left and right sides, and a symmetry of the two sides may be analyzed for disease diagnosis scenarios. Merely by way of example, in a cerebral hemorrhage scenario, the hematoma may squeeze the brain parenchyma, and a severity degree of the hematoma may be evaluated by determining an offset of the MSP.

In some embodiments, for each of the at least one plane identifier probability map, a target point set may be determined based on the plane identifier probability map.

In some embodiments, for each of the at least one plane identifier probability map, a set of pixel points in the plane identifier probability map may be determined as the target point set, and a probability of each pixel point in the set of pixel points may be larger than a preset threshold. The following descriptions take the MSP probability map as an exemplary plane identifier probability map, and the MSP as an exemplary plane identifier. For instance, an MSP plane point set S (also referred to as the target point set) may be determined (e.g., extracted) from the MSP probability map, and then a fixed threshold segmentation may be performed on the MSP probability map to determine the MSP plane point set S. A probability of each pixel point in the MSP plane point set S is larger than the preset threshold. The preset threshold may be determined as any constant between a range from 0 to 1, e.g., 0.5. After the MSP plane point set S is determined, the MSP plane point set S may be fitted based on a preset algorithm to obtain a fitting plane, and the obtained fitting plane may be designated as the MSP of the brain of the target subject.

In some embodiments, the target point set may also be determined in other manners. For example, a set of pixel points with the top probabilities in the at least one plane identifier probability map may be determined as the target point set, which is not limited in the present disclosure.

In some embodiments, after the target point set is determined, the plane identifier may be obtained by fitting the target point set.

In some embodiments, the plane identifier may be obtained by fitting the target point set based on a random sample consensus (RANSAC) algorithm.

In some embodiments, the RANSAC algorithm may be performed as follows.

Multiple loops (e.g., N loops, and N>10) of the following operations may be performed. The following operations may include a) determining a subset by randomly sampling the target point set; b) obtaining a plane by fitting points in the subset; and c) determining a sum of squares of distances between the plane and remaining points of the target point set except the subset. A plane corresponding to one loop with a minimum sum of squares of distances among the multiple loops may be determined as the plane identifier.

Merely by way of example, when the plane identifier probability map is the MSP probability map, and the plane identifier is the MSP, the MSP obtained by fitting may be represented using a linear equation, or represented using a normal vector $\vec{n}$ of a point O on the MSP obtained by fitting and the plane. Taking the latter representation as an example, the MSP obtained by fitting may be represented as $L(O, \vec{n})$. If the preset algorithm is the RANSAC algorithm, the plane fitting algorithm based on the RANSAC algorithm may be represented as follows.

First, N loops of the following operations may be performed based on the RANSAC algorithm, wherein differences between the N loops may be that M points in the MSP plane point set S are different, and N may be any constant (e.g., a constant greater than 10) during the N loops, e.g., N=1000. Since at least three points can determine a plane, M may be any constant greater than 2 (i.e., greater than or equal to 3).

The M points may be randomly sampled from the point MSP plane set S, and a plane $L_i$ may be obtained by fitting the M points and recorded. Then a sum of squares of distances between the plane $L_i$ and remaining points in the point MSP plane set S may be determined, and the sum of squares of distances may be recorded as $Dist_i$.

Then, in the N loops, a plane $L_k$ corresponding to a sampling (it is assumed that the sampling corresponds the $k^{th}$ loop) with a minimum sum of squares of distances in the recorded sums of distances $Dist_i$ may be determined as an initial localization plane of the MSP.

Finally, the plane $L(O, \vec{n})$ may be fit using a following manner.

The point O may be determined according to the following equation:

$$O = \frac{\Sigma_{i=0}^{M} P_i}{M}, \tag{1}$$

where $P_i$ denotes a coordinate location of an i-th point of the M points obtained by the sampling. For example, if M is equal to 3, the point O may be $(P_1+P_2+P_3)/3$.

The normal vector $\vec{n}$ of the plane may be determined in two cases. In one case, if M is equal to 3, the normal vector of the MSP may be directly determined through three points A, B, and C according to the following equation:

$$\vec{n} = \frac{\overrightarrow{AB} \times \overrightarrow{AC}}{|\overrightarrow{AB}||\overrightarrow{AC}|}, \tag{2}$$

where $\vec{n}$ denotes the normal vector of the MSP, $\overrightarrow{AB}$ denotes a vector from the point A to the point B, and $\overrightarrow{AC}$ denotes a vector from the point A to the point C.

In another case, if M is larger than 3, the normal vector $\vec{n}$ of the MSP may be determined by obtaining a minimum principal component direction of the M points using a principal component analysis (PCA) algorithm. For example, the M sampling points may be represented as a matrix $A_{M,3}$ with M rows and 3 columns, and eigen decomposition of the matrix $A_{M,3}$ may be performed using a singular value decomposition (SVD) algorithm. The eigen decomposition may be represented according to the following equation:

$$A_{M,3} = U_{M,M} \Sigma_{M,3} V_{3,3}, \tag{3}$$

where U denotes a left singular matrix, V denotes a right singular matrix, and $\Sigma$ denotes an eigenmatrix.

The right singular matrix V obtained by decomposing the matrix $A_{M,3}$ may be used to represent an eigen decomposition matrix of the matrix $A_{M,3}$. A third column $V[:,2]$ of V may be used to represent a direction of a minimum component of the M points among the three decomposition components, and designated as the normal vector $\vec{n}$ of the fitting plane of the M points. The normal vector $\vec{n}$ may be represented according to the following equation:

$$\vec{n} = (V(0,2), V(1,2), V(2,2)). \tag{4}$$

In some embodiments, for each of the at least one plane identifier, the plane identifier may be obtained by fitting the target point set in other manners, which is not limited in the present disclosure.

Generally, the MSP may be an important reference plane of a Talairach coordinate system, and the localization of the MSP may be a prerequisite for the localization of the AC landmark and the PC landmark. The localization of the MSP may include an algorithm based on global symmetry analysis, an algorithm based on brain parenchyma segmentation, an algorithm based on feature landmark detection, an algorithm based on atlas registration, or the like, or any combination thereof. These algorithms may achieve good results on normal brain structures. However, for pathological brain structures, such as asymmetric brain structures, brain structures much different from the templates, etc., the adaptability of these algorithms may be reduced.

According to some embodiments of the present disclosure, a method for determining the MSP is provided. The method may obtain the MSP probability map through the preset neural network model, and then determine the MSP based on the MSP probability map. The MSP of the brain of the target subject can be efficiently and accurately determined both normal brain structures and pathological brain structures.

In some embodiments, the at least one region identifier of the specific part may be determined based on the at least one region identifier probability map of the specific part (e.g., brain, etc.). For example, a segmentation result of a target region may be determined from the at least one region identifier probability map. As shown in FIG. 4, at least one region identifier 441 may be determined based on the at least one region identifier probability map 431.

A region identifier probability map refers to an image representing a probability of the region identifier, e.g., a probability map of a brain parenchyma region, etc. The target region refers to a specific region of the specific part, e.g., the cerebral cortex, the cerebral sulci, left and right brains, the cerebellum, the ventricle, the brainstem, or the like. The segmentation result of the target region may be a segmentation result of various organs/tissues, e.g., the segmentation result of the cerebral cortex, etc.

When the specific part includes the brain, in some embodiments, the target region may include the cerebral cortex, the at least one region identifier probability map of the brain may include a probability map of the brain parenchyma region, and the segmentation result of the cerebral cortex may include the brain parenchyma region, etc. The segmentation result of the cerebral cortex may be determined from the probability map of the brain parenchyma region.

In some embodiments, in addition to obtaining the segmentation result of the cerebral cortex by segmenting the cerebral cortex, segmentation results of other target regions may be obtained by segmenting structures (e.g., the brain sulci, the left and right brains, the cerebellum, the ventricle, the brainstem, etc.) of the brain. The segmentation of these structures may be widely used in scenarios such as brain region parameter statistics for diagnosis, surgical planning, etc.

In some embodiments, the at least one region identifier probability map may include the probability map of the brain parenchyma region, and the at least one region identifier may include the brain parenchyma region. A binary mask image of the brain parenchyma may be generated based on the probability map of the brain parenchyma region and a preset threshold, and the brain parenchyma region may be determined based on the binary mask image of the brain parenchyma. For instance, a threshold segmentation may be performed on the probability map of the brain parenchyma region. The preset threshold may usually be determined as a constant between a range from 0 to 1, e.g., 0.5. After the threshold segmentation is performed, the binary mask image of the brain parenchyma may be obtained. For example, values of pixel points in the probability map of the brain parenchyma region whose probability values are greater than or equal to 0.5 may be set as 1, and values of pixel points in the probability map of the brain parenchyma region whose probability values are less than 0.5 may be set as 0, so that a value of each pixel in the finally obtained image is either 0 or 1, thereby forming the binary mask image of the brain parenchyma. Then the brain parenchyma region may be determined based on the binary mask image of the brain parenchyma.

A value of each pixel point in each type of identifier probability maps may represent a probability value that the pixel point belongs to a corresponding identifier. Therefore, in some embodiments, a position of the corresponding identifier in the identifier probability map may be determined based on the probability value of each pixel point. In some embodiments, the position of the corresponding identifier may also be determined from the identifier probability map in other manners. For example, the position of the corresponding identifier may be determined through another neural network model. That is, a position of the corresponding identifier in the probability map may be obtained by inputting each type of identifier probability map into another pre-trained neural network model. As another example, pixel points in the probability map that satisfy a preset condition may be determined as corresponding identifiers, which is not limited in the present disclosure.

In 340, a target coordinate system may be constructed based on the at least one landmark identifier and the at least one plane identifier. As shown in FIG. 4, a brain coordinate system 450 may be established based on the at least one landmark identifier 442 and the at least one plane identifier 443. In some embodiments, operation 340 may be performed by the identifier localization module 230.

The target coordinate system refers to a coordinate system established based on the specific part, which may be configured to represent a spatial structure and a positional relationship of the specific part. The target coordinate system may be various coordinate systems, e.g., a plane-rectangular coordinate system, a spherical coordinate system, a Talairach coordinate system, etc. In some embodiments, the target coordinate system may be a brain coordinate system, and the brain coordinate system (e.g., the Talairach coordinate system) may be used to establish a corresponding relationship between a brain structure and a spatial position of the brain structure of the target subject. By establishing the brain coordinate system, a same brain region of different target subjects may be studied in a same neuroanatomical space for lateral comparison.

Figure 9:
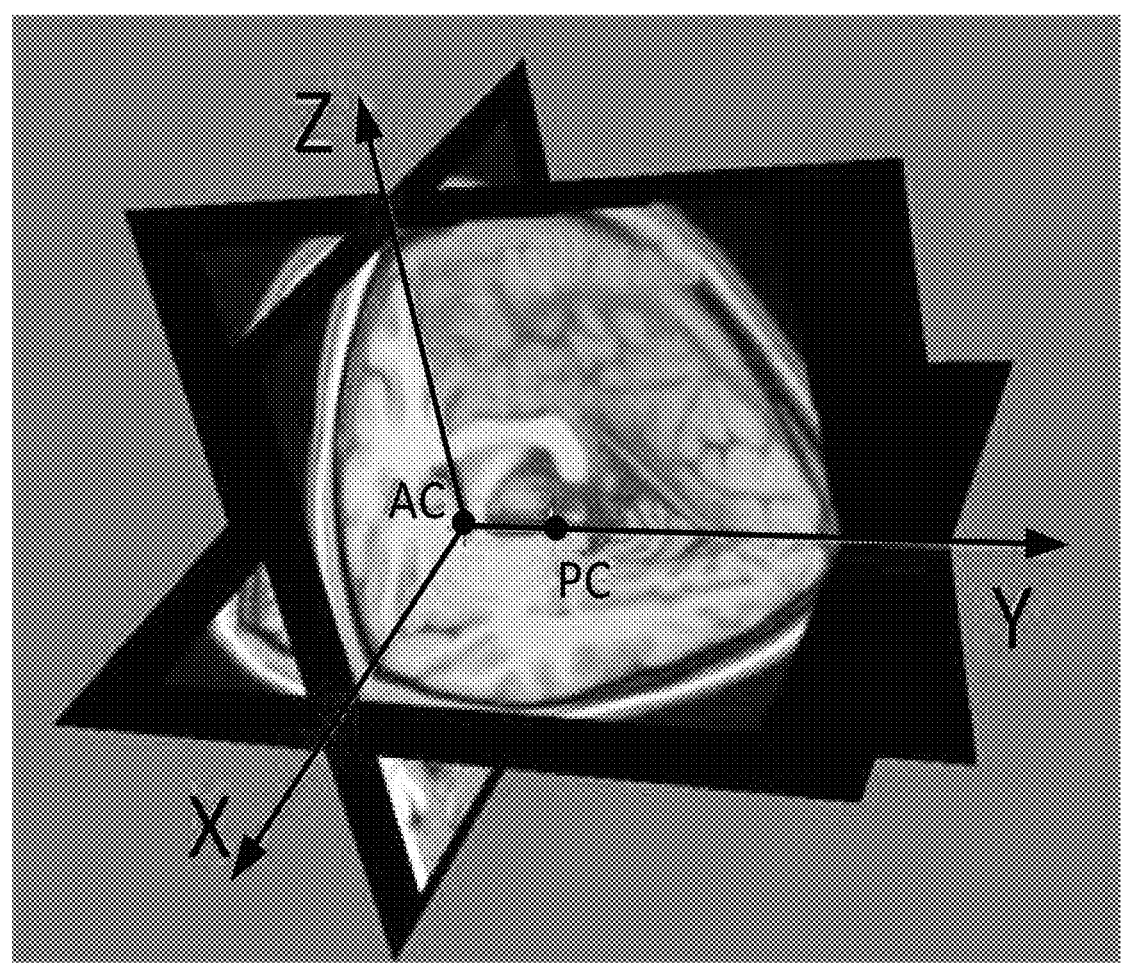
FIG. 9 is a schematic diagram illustrating a brain coordinate system according to some embodiments of the present disclosure.

In some embodiments, the brain coordinate system may be established based on the at least one landmark identifier and the at least one plane identifier determined in the above operations. For example, the at least one landmark identifier includes the AC landmark and the PC landmark, and the at least one plane identifier includes the MSP, and the Talairach coordinate system may be established by performing the following operations. For instance, the AC landmark may be used as an origin of the Talairach coordinate system. A direction from the PC landmark to the AC landmark may be defined as a Y-axis direction. An axis perpendicular to the MSP and passing through the AC landmark may be defined as an X-axis, and a positive direction may be defined as a direction from right to left of the brain. An axis perpendicular to a plane of the X-axis and the Y-axis and passing through the AC landmark may be defined as a Z-axis, and a positive direction may be defined as a direction from the foot to the head, so that the brain coordinate system (the Talairach coordinate system) as shown in FIG. 9 may be constructed.

In 350, the at least one landmark of the cerebral cortex may be determined based on the segmentation result of the cerebral cortex, the target coordinate system, and/or the at least one landmark identifier. As shown in FIG. 4, at least one landmark 460 of the cerebral cortex may be determined based on the at least one region identifier 441, the at least one landmark identifier 442, and the brain coordinate system 450. In some embodiments, operation 350 may be performed by the identifier localization module 230. In some embodiments, the at least one landmark of the cerebral cortex may include at least one of a frontmost point of the cerebral cortex, a rearmost point of the cerebral cortex, a leftmost point of the cerebral cortex, a rightmost point of the cerebral cortex, an inferior point of the cerebral cortex, and a superior point of the cerebral cortex.

The at least one landmark refers to one or more points for identification that can represent a spatial structure and/or a spatial position of the target region, e.g., Talairach cortical landmarks, etc. The Talairach cortex landmarks refer to six landmarks (direction descriptions are based on a patient coordinate system) at a frontmost end, a rearmost end, a leftmost end, a rightmost end, an inferior end, and a superior end of the brain (excluding a scalp and cerebrospinal fluid) in a Talairach coordinate space. The six landmarks are referred to as the landmarks of the cerebral cortex. Specific definitions of the landmarks of the cerebral cortex may be shown in Table 1.

TABLE 1

| Landmarks of cerebral cortex | Standard determination method in medical |
| --- | --- |
| The frontmost point AP of the cerebral cortex | An intersection point between the Y-axis and the cerebral cortex at a front side of the brain |
| The rearmost point PP of the cerebral cortex | An intersection point between the Y-axis and the cerebral cortex at a rear side of the brain |
| The leftmost point LP of the cerebral cortex | An intersection point between a line (passing through the point PC and parallel to the X-axis) and a left side of the cerebral cortex |
| The rightmost point RP of the cerebral cortex | An intersection point between a line (passing through the point PC and parallel to the X-axis) and a right side of the cerebral cortex |
| The inferior point IP of the cerebral cortex | An intersection point between the Z-axis and an inferior side of the cerebral cortex |
| The superior point SP of the cerebral cortex | An intersection point between a line (passing through the PC and parallel to the Z-axis) and a superior side of the cerebral cortex |

By combining the Talairach coordinate system and the at least one landmark of the cerebral cortex, high-precision atlas mapping and atlas registration that does not rely on the matching of image grayscale information can be performed. Compared with the atlas registration algorithm based on the grayscale information, the high-precision atlas mapping and atlas registration that does not rely on the matching of image grayscale information has higher accuracy and higher applicability, and can be further used in segmentation and localization of brain structures or regions on the MRI image, even a portion of the MRI image has no structural information.

When the specific part includes the brain, in some embodiments, the target region may include the cerebral cortex, the segmentation result of the target region may include the segmentation result of the cerebral cortex, and the target coordinate system may be the Talairach coordinate system. The at least one landmark identifier may include the AC landmark and the PC landmark, the at least one plane identifier may include the MSP, and the at least one landmark of the cerebral cortex may be determined based on the segmentation result of the cerebral cortex, the target coordinate system, and/or the at least one landmark identifier.

In some embodiments, a contour of the cerebral cortex may be determined based on the segmentation region of the brain parenchyma. An outer contour of the brain parenchyma is the contour of the cerebral cortex. That is, a region formed by the contour of the cerebral cortex is the segmentation region of the brain parenchyma.

In some embodiments, after the contour of the cerebral cortex is determined, the at least one landmark (e.g., the frontmost point AP of the cerebral cortex, the rearmost point PP of the cerebral cortex, the leftmost point LP of the cerebral cortex, the rightmost point RP of the cerebral cortex, the inferior point IP of the cerebral cortex, the superior point SP of the cerebral cortex, etc.) may be determined based on the contour of the cerebral cortex and axes of the previously determined brain coordinate system.

In some embodiments, the at least one landmark of the cerebral cortex may be determined based on a maximum point or a minimum point of the cerebral cortex along one direction of the three coordinate axes of the target coordinate system. For example, a point with a maximum Y-coordinate value of the contour of the cerebral cortex on the Y-axis of the Talairach coordinate system may be determined as the frontmost point AP of the cerebral cortex, a point with a minimum Y-coordinate value of the contour of the cerebral cortex on the Y-axis of the Talairach coordinate system may be determined as the rearmost point PP of the cerebral cortex, and a point with a minimum Z-coordinate value of the contour of the cerebral cortex on the Z-axis of the Talairach coordinate system may be determined as the inferior point IP of the cerebral cortex.

In some embodiments, a maximum point or a minimum point of the cerebral cortex that passes through the at least one landmark identifier and is parallel to one direction of the three coordinate axes of the target coordinate system may be determined as the at least one landmark of the cerebral cortex. For example, a point with a maximum X-coordinate value of the contour of the cerebral cortex on the X-axis of the Talairach coordinate system that passes through the PC landmark may be determined as the rightmost point RP of the cerebral cortex. A point with a minimum X-coordinate value of the contour of the cerebral cortex on the X-axis of the Talairach coordinate system that passes through the PC landmark may be determined as the leftmost point LP of the cerebral cortex. A point with a maximum Z-coordinate value of the contour of the cerebral cortex on a straight line passing through the PC landmark and parallel to the Z-axis may be determined as the superior point SP of the cerebral cortex.

For instance, the six landmarks of the cerebral cortex may be obtained by determining the maximum and minimum coordinate values of all contour points of the cerebral cortex along the X-axis, the Y-axis, and the Z-axis of the Talairach coordinate system, respectively. A set of points on the contour of the cerebral cortex (i.e., a set of cortical points) may be obtained, and then the contour of the cerebral cortex may be searched along a positive direction of the Y-axis of the Talairach coordinate system starting from the AC landmark, and a point that has the maximum Y-coordinate value of the contour of the cerebral cortex may be determined as the frontmost point AP of the cerebral cortex. The contour of the cerebral cortex may be searched along a negative direction of the Y-axis of the Talairach coordinate system, and a point that has the minimum Y-coordinate value of the contour of the cerebral cortex may be determined as the rearmost point PP of the cerebral cortex. Pixel points on the contour of the cerebral cortex may be searched along a negative direction of the Z-axis, and a point that has a minimum Z-coordinate value of the contour of the cerebral cortex may be determined as the inferior point IP of the cerebral cortex. A point that has the maximum Z-coordinate value of the contour of the cerebral cortex on the straight line passing through the PC and parallel to the Z-axis may be determined as the superior point SP of the cerebral cortex. Pixel points of the contour of the cerebral cortex may be searched along the positive direction of the X-axis of the Talairach coordinate system starting from the point PC, and a point that has the minimum X-coordinate value of the contour of the cerebral cortex contour may be determined as the leftmost point LP of the cerebral cortex. Pixel points of the contour of the cerebral cortex may be searched along the negative direction of the X-axis of the Talairach coordinate system, and a point on the X-axis that has the maximum X-coordinate value of the contour of the cerebral cortex may be determined as the rightmost point RP of the cerebral cortex.

Generally, the extraction of the at least one landmark of the cerebral cortex may include performing segmentation on brain tissues of a 2D plane where the at least one landmark of the cerebral cortex is located and then locating, or performing 3D brain segmentation by using a 3D deformation model to locate the at least one landmark of the cerebral cortex. However, these manners are poor in stability and time efficiency, and the entire algorithm process is complicated with low fault tolerance and low efficiency.

According to some embodiments of the present disclosure, the method for determining the at least one landmark of the cerebral cortex may determine a probability map of the brain parenchyma region through the neural network model, and then determine the brain parenchyma region from the probability map of the brain parenchyma region. The method may determine the contour of the cerebral cortex based on the brain parenchyma region. Finally, the at least one landmark of the cerebral cortex may be determined based on the maximum and minimum coordinate values of the contour of the cerebral cortex along each axis of the brain coordinate system. In this way, both the stability and the determination efficiency may be improved, thereby efficiently and accurately determining the at least one landmark of the cerebral cortex.

The processes of determining the at least one landmark identifier, the at least one plane identifier, the at least one region identifier, and other identifiers (e.g., the at least one landmark of the cerebral cortex, etc.) of the brain are described in different embodiments, but it still needs to be emphasized that the determination of the at least one landmark identifier, the at least one plane identifier, and the at least one region identifier may be performed simultaneously in the embodiments of the present disclosure. For instance, after different types of identifier probability maps are obtained through the preset neural network model, the corresponding types of identifiers may be obtained based on the different types of identifier probability maps using the method described in the embodiments. The determination of the corresponding types of identifiers based on the different types of identifier probability maps may be regarded as a post-processing process. In this way, all the brain identifiers of the target subject may be determined as a whole by determining the different types of identifier probability maps, and then performing the corresponding post-processing process.

In some embodiments, the entire process of the obtaining the identifier probability maps and the post-processing (determining the localization results of the identifiers) may be performed by one model. An input of the model may be an image of the specific part, e.g., the MRI image of the brain, etc., and an output of the model may be any localization result of the identifiers, e.g., the at least one region identifier, the at least one landmark identifier, the at least one plane identifier, the brain coordinate system, the at least one landmark of the cerebral cortex, etc. In some embodiments, the model may be a machine learning model, e.g., a neural network model (e.g., a CNN model, an FCN model, etc.). In some embodiments, the model may be one model, or a plurality of models connected back and forth. For example, the model may be formed by two models connected back and forth, wherein a former model of the two models may be used to determine and output the identifier probability maps, and a latter model of the two models may be used to receive the identifier probability maps output by the former model, and determine and output the localization results of the identifiers. The model may be trained in various manners, e.g., joint training, etc.

FIG. 5 is a flowchart illustrating an exemplary process 500 for training a neural network model according to some embodiments of the present disclosure.

As shown in FIG. 5, the process 500 may include the following operations. In some embodiments, the process 500 may be performed by the second computing device 130.

In 510, training sample images and gold standard images corresponding to each of the training sample images may be obtained. The gold standard images corresponding to each of the training sample images may include at least one region identifier gold standard image, at least one landmark identifier gold standard image, and/or at least one plane identifier gold standard image.

The training sample images refer to a training sample set, which are sample images used to train the neural network model. The training sample images may include various types of images, e.g., CT images, MRI images, etc. The training sample images may include images of various organs/tissues, e.g., brain images, heart images, etc. In some embodiments, the training sample images may include MRI images of the head.

The gold standard images refer to images used as labels of the training sample images, and may be labeled training sample images. In some embodiments, the gold standard images may include the region identifier gold standard images, the landmark identifier gold standard images, and/or the plane identifier gold standard images.

In some embodiments, the neural network model may be a multi-task network model, and different tasks may be used to determine different types of identifiers. Therefore, the training sample images and the gold standard images corresponding to each type of identifier tasks may be obtained before the neural network model is trained. In order to improve the accuracy of the various types of identifier probability maps finally output by the neural network, the diversity of samples needs to be enriched as much as possible when the training sample images corresponding to each type of identifier tasks are obtained.

In some embodiments, the training sample images may be obtained in various manners. For example, a large number of normal, pathological, or other special brain images of different subjects in different modalities may be obtained by scanning or obtained from a storage. As another example, the training sample images may be obtained by performing stretching, cropping, deformation, etc., on an MRI image.

In some embodiments, when the training sample images are obtained, gold standard labeling may be performed on the training sample images to obtain the corresponding gold standard images. In some embodiments, the gold standard labeling may be performed on the training sample images in various manners based on specific types of the identifier tasks.

In some embodiments, for a landmark identifier task, a probability value of a pixel point representing an anatomical landmark of each MRI image of the brain may be labeled as a first value, and a probability value of a pixel point other than the anatomical landmark may be labeled as a second value, so as to obtain a gold standard image corresponding to the landmark identifier task. The first value may be set to 1, and the second value may be determined using an algorithm constructed based on a distance between each pixel point and the anatomical landmark. For instance, the anatomical landmark may include an AC landmark and a PC landmark, and the location coordinates of the AC landmark and the PC landmark may be recorded in the MRI image of the brain. Since there are two anatomical landmarks, two probability maps of a same size as the MRI image of the brain may be generated. The AC landmark may correspond to one probability map, and the PC landmark may correspond to another probability map. Taking a gold standard probability map of the AC landmark as an example, a probability value of a pixel point at a labeled position of the AC landmark may be 1, and the probability value of each remaining pixel point may have a negative correlation with its distance away from the labeled position of the AC landmark. For example, the probability may be determined based on a Gaussian function with respect to the distance. The probability values determined based on the Gaussian function may be referred to as the second value. The Gaussian function may be determined according to the following equation:

$$p = \frac{1}{\sigma\sqrt{2\pi}}e^{-\frac{1}{2}\left(\frac{d}{\sigma}\right)^2}, \tag{5}$$

where p denotes a probability value of the pixel point; d denotes the distance between the pixel point and the labeled point of the AC landmark or the PC landmark; and σ denotes a variance of the Gaussian function, which may be any constant. For example, σ is equal to 10. The size of the variance may affect a convergence speed of an image algorithm and a localization accuracy of the final point. Therefore, in order to achieve a relatively fast convergence speed in an early stage of the training and a good localization accuracy in a later stage of the training, σ may be set to a relatively large value in the early stage to increase the convergence speed. σ may be gradually reduced during the training process, and a prediction accuracy of the point may be improved in the later stage of the training.

In some embodiments, for a plane identifier task, probability values of pixel points on an MSP of each MRI image of the brain may be labeled as the first values, and probability values of pixel points other than the pixel points on the MSP may be labeled as third values, so as to obtain a gold standard image corresponding to the plane identifier task. Similar to the at least one landmark identifier, the first values may be set to 1, and the third values may be determined based on a preset algorithm. The preset algorithm may be constructed based on a distance between each pixel point and the MSP. For instance, the labeling may include determining the pixel points on the MSP of the brain in the plurality of MRI images using a labeling tool, and then a gold standard MSP equation may be obtained by fitting the pixel points. A count of determined pixel points may be greater than 3 in theory. However, the more the count is, the better in effect may be. For example, 20 pixel points on the MSP of the image may be evenly labeled for plane fitting. After the MSP is determined, remaining pixel points on the image may be labeled. Since there is only one MSP, a probability map of a same size as an original image (e.g., the image) may be generated after labeling. The probability value of each pixel point located on the MSP may be 1. For pixel points not located on the MSP, the closer the distance between the MSP and the pixel points, the greater the probability values. The probability values of the pixel points not located on the MSP may conform to the Gaussian distribution defined by Equation (5). Therefore, the probability values of the pixel points may be determined by using a manner similar as how the landmark identifier task is determined as described above. The probability value determined based on the Gaussian function defined in Equation (5) may be referred to as the third value, wherein d in Equation (5) denotes the distance between the MSP and each pixel point.

In some embodiments, for a region identifier task, probability values of pixel points of the brain parenchyma in each MRI image of the brain may be labeled as the first values, and probability values of pixel points other than the pixel points of the brain parenchyma may be labeled as fourth values, so as to obtain a gold standard image corresponding to the region identifier task. Similar to the at least one landmark identifier, the first values may be set to 1, and the fourth values may be set to 0. For instance, a binary image with a same size as an input MRI image and only containing values of 0 and 1 may be obtained by labeling the MRI image of the brain pixel by pixel. Pixel points with values of 1 may represent pixels belonging to the brain parenchyma, and pixel points with values of 0 may represent non-parenchymal pixels. The manner of labeling may be performed using open-source software freesurfer, and automatic labeling results of the open-source software freesurfer may be fine-tuned.

In some embodiments, a branch corresponding to the region identifier task in the neural network model may output 2-channel probability maps, which respectively represent a predicted probability of the background and a predicted probability of the cerebral cortex (brain parenchyma). Two binary images containing only 0 and 1 values may be generated using a same gold standard. For example, in the probability map representing the background, a value of each pixel in the background is 1 and a value of each pixel in a target is 0; and in the probability map representing the cerebral cortex, a value of each pixel in the background is 0 and a value of a target is 1.

In 520, at least one predicted region identifier probability map output by a first branch network layer, at least one predicted landmark identifier probability map output by a second branch network layer, and/or at least one predicted plane identifier probability map output by a third branch network layer may be obtained, respectively, by inputting each training sample image into an initial neural network model.

The initial neural network model refers to an untrained neural network model, e.g., a CNN model, an FCN model, etc. In some embodiments, the initial neural network model may be constructed based on a type, a count, etc., of tasks.

In some embodiments, the initial neural network model may be constructed before training, and a shared network layer and branch network layers of different types of identifier tasks may be set. The network layer may include a convolutional layer, a normalization layer (batch normalization, instance normalization, or group normalization), an activation layer, a pooling layer, a transpose convolutional layer, an upsampling layer, or the like, or any combination thereof, which are not limited in the embodiments of the present disclosure. For example, different types of identifier tasks may include the landmark identifier task, the plane identifier task, and the region identifier task. The three tasks may be performed through heatmap regression, and outputs of the three branches may be probability maps that have the same size as input images. Correspondingly, an output of the region identifier task may be a probability map of the brain parenchyma region, so as to determine the brain parenchyma region, determine the contour of the cerebral cortex based on the brain parenchyma region, and then determine the landmarks of the cerebral cortex based on the contour of the cerebral cortex and the brain coordinate system. An output of the landmark identifier task may be the AC probability map and the PC probability map, which may be used to localize the AC landmark and the PC landmark. An output of the plane identifier task may be the MSP probability map, which may be used to localize the MSP (equivalent to locating all pixel points on the MSP).

In some embodiments, when the neural network model is constructed, a network structure may adopt any type of the FCN model, e.g., a U-Net model, a V-Net model, a SegNet model, a multi-task FCN model with an encoder-decoder structure, etc.

Figure 8:
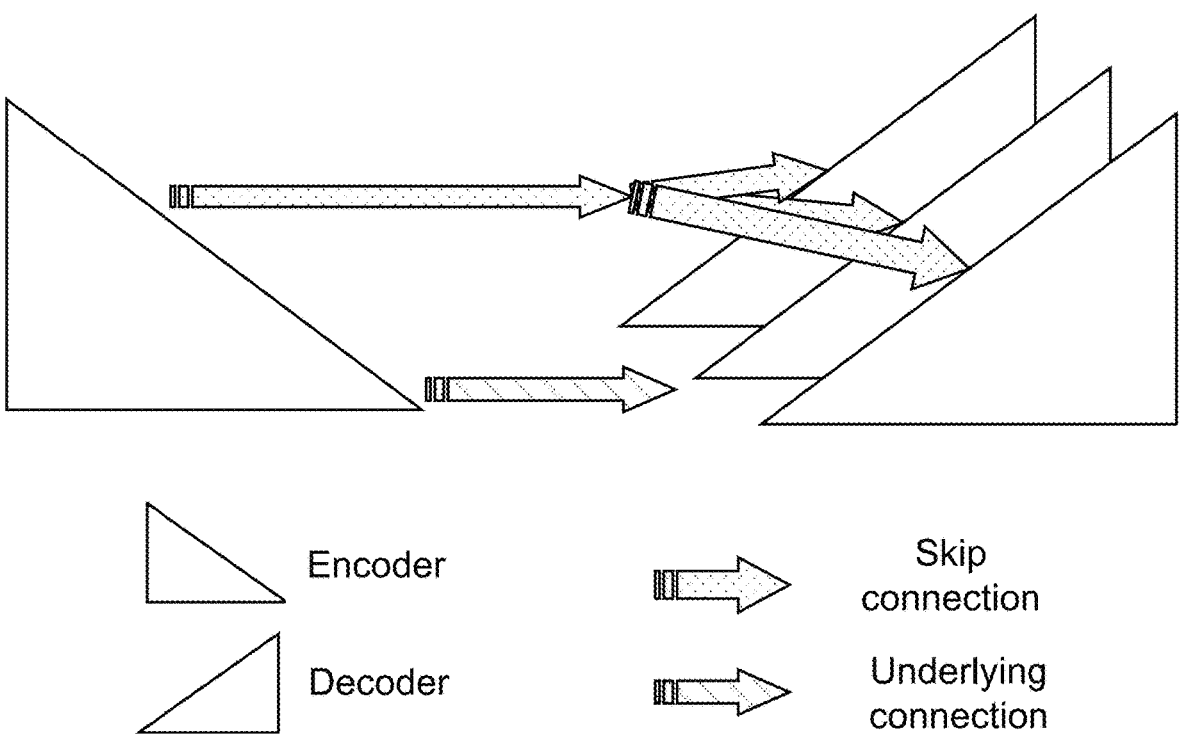
FIG. 8 is a schematic diagram illustrating a structure of a neural network model according to some embodiments of the present disclosure.

FIG. 8 is a schematic diagram illustrating a structure of a neural network model according to some embodiments of the present disclosure. FIG. 8 illustrates a multi-task FCN model with an encoder-decoder structure, including 1 encoder and 3 decoders, wherein the encoder may be connected to each of the three decoders through a skip connection and an underlying connection.

In some embodiments, a U-Net model may be used as a basic model of the multi-task FCN model. An encoder structure (an encoder) of the U-Net model may be used as a weight sharing layer, and then three different decoder structures (decoders) may be derived. In practical use, the structure of the initial U-Net model may be improved based on actual situation(s). For example, a count of basic channels and a count of sampling times may be reduced, which can reduce the resource occupation of the algorithm. Although the three decoder branches derived from the U-Net model have a same overall structure, a count of output channels of the three branches may be different due to different tasks. An output of a branch 1 may be a 2-channel probability map, and each channel may correspond to a probability map, which may respectively represent a predicted probability of the brain parenchymal region and a predicted probability of the brain background. An output of a branch 2 may be a 2-channel probability map, which may respectively represent a predicted probability of an AC landmark and a predicted probability of a PC landmark. An output of a branch 3 may be a 1-channel probability map, which may represent a predicted probability of points on the MSP. In some embodiments, the output of the branch 1 may be a 1-channel probability map, which may represent the predicted probability of the brain parenchyma region or the predicted probability of the brain background.

In some embodiments, before the obtained training sample images are input into the constructed initial neural network model, a normalization operation may be performed on training sample images. Taking the training sample images being T1 images (MRI T1 weighted images) as an example, before the T1 images are input into the constructed initial neural network model, the normalization operation may be performed on the T1 images. The normalization operation may be performed in various manners, which are not limited in the present disclosure. For example, a mean value and a variance value of input samples may be determined. As another example, the mean value may be subtracted from a grayscale of each pixel point of each sample, and then the subtracted grayscale of each pixel point of each sample may be divided by the variance.

In some embodiments, after the normalization operation, at least one predicted region identifier probability map output by the first branch network layer, at least one predicted landmark identifier probability map output by the second branch network layer, and at least one predicted plane identifier probability map output by the third branch network layer may be obtained, respectively, by inputting the normalized training sample set (i.e., each training sample image) into the initial neural network model.

Figure 7:
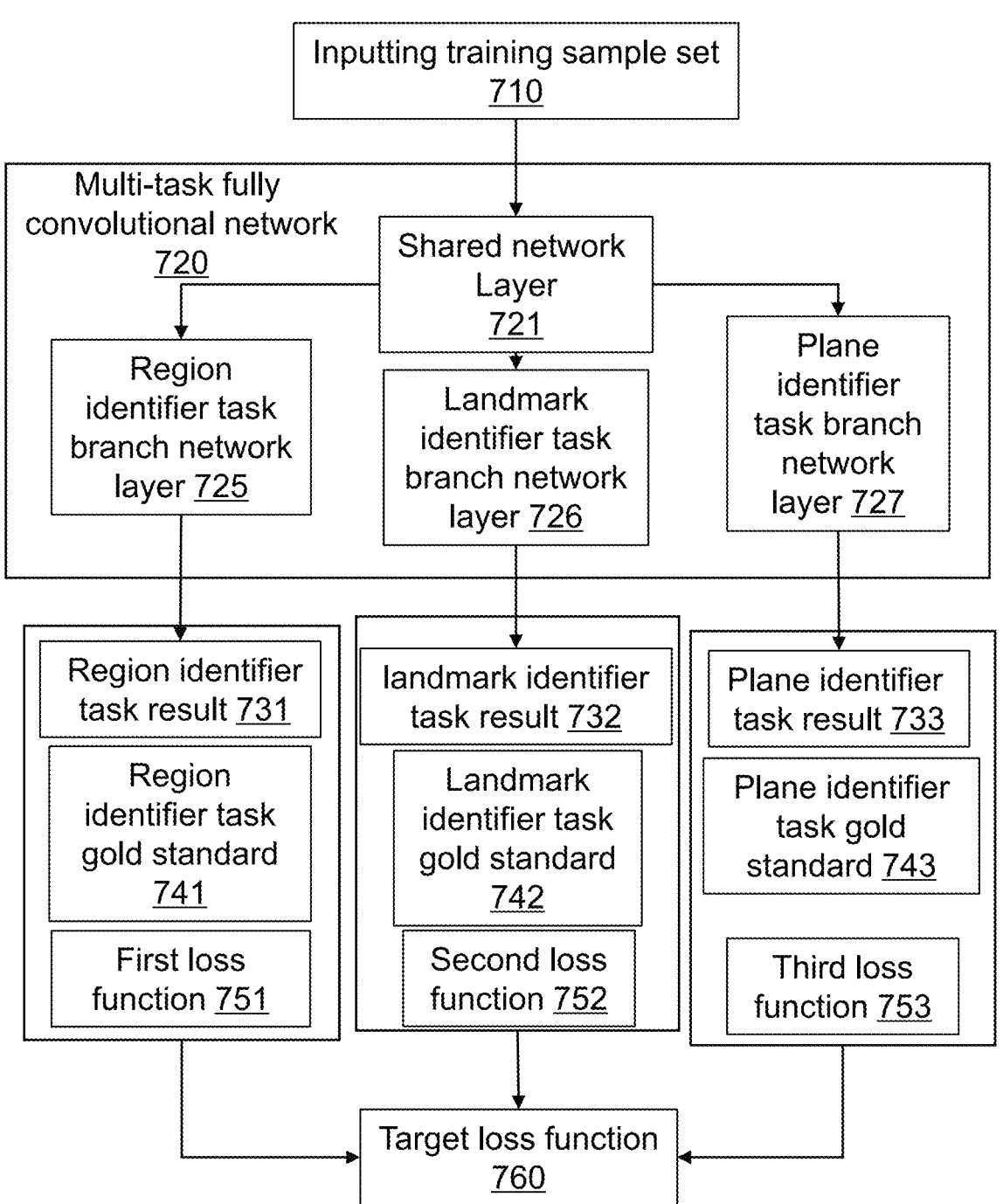
FIG. 7 is a schematic diagram illustrating a process of training a neural network model according to some embodiments of the present disclosure.

FIG. 7 is a schematic diagram illustrating a process for training a neural network model according to some embodiments of the present disclosure.

As shown in FIG. 7, a training sample set may be input into a shared network layer 721 of a multi-task FCN model 720 in operation 710, and the shared network layer 721 may extract features of the training sample set. Then, three identifier tasks may be performed by different branch network layers. A region identifier task may be performed by a region identifier task branch network layer 725, a landmark identifier task may be performed by a landmark identifier task branch network layer 726, and a plane identifier task may be performed by a plane identifier task branch network layer 727. Identifier task results (i.e., a region identifier task result 731, a landmark identifier task result 732, and a plane identifier task result 733) may be output, respectively. These identifier task results may be predicted probability maps of the identifier tasks, respectively.

In 530, a value of a target loss function may be determined based on the at least one predicted region identifier probability map, the at least one predicted landmark identifier probability map, the at least one predicted plane identifier probability map, the at least one region identifier gold standard image, the at least one landmark identifier gold standard image, and/or the at least one plane identifier gold standard image.

The target loss function refers to a loss function corresponding to the entire neural network model, which may be configured to adjust and update the neural network model. In some embodiments, after the identifier task results are obtained, the target loss function may be determined based on the identifier task results and the gold standard images corresponding to the identifier task results.

In some embodiments, a loss function corresponding to each task may be obtained based on each identifier task result (i.e., the identifier probability map), and then the target loss function may be determined based on the obtained one or more loss functions. For example, the value of the target loss function may be determined based on the at least one predicted region identifier probability map, the at least one predicted landmark identifier probability map, the at least one predicted plane identifier probability map, the at least one region identifier gold standard images, the at least one landmark identifier gold standard images, and/or the at least one plane identifier gold standard images. More descriptions regarding the determination of the target loss function may be found in FIG. 6 and relevant descriptions thereof, which are not repeated herein.

In 540, a trained neural network model may be obtained by adjusting parameters of the initial neural network model based on the value of the target loss function.

In some embodiments, after the value of the target loss function is obtained, the parameters of the initial neural network model may be adjusted based on the value of the target loss function. For example, the parameters of the initial neural network model may be adjusted by using an error backpropagation gradient descent algorithm, wherein an optimizer may use Adam, and a learning rate may be set to $10^{-4}$. The value of the target loss function may be continuously adjusted by repeating the above operations until a change range of the value of the target loss function is less than a preset value, thereby obtaining the neural network model. The change range of the value of the target loss function being less than the preset value represents that the value of the target loss function tends to be stable, and a training process of the neural network model satisfies a convergence condition.

In some embodiments of the present disclosure, the neural network model may include the shared network layer and different branch networks. Therefore, when the probability maps of different identifier tasks are extracted simultaneously, features may be extracted from the branch network layers, respectively, and the parameter sharing may be performed in the shared network layer, thereby saving operation resources, and improving the efficiency of feature extraction of each identifier task. Moreover, by designing different task loss functions for different tasks, the training progress and direction of the neural network model may be monitored in a targeted manner, thereby ensuring the training efficiency and accuracy of the neural network model.

FIG. 6 is a flowchart illustrating an exemplary process 600 for training a neural network model according to some embodiments of the present disclosure.

As shown in FIG. 6, the process 600 may include the following operations. In some embodiments, the process 600 may be performed by the second computing device 130.

In 610, a value of a first loss function may be determined based on at least one predicted region identifier probability map and at least one region identifier gold standard image.

In some embodiments, the value of the first loss function may be determined based on the at least one predicted region identifier probability map and the at least one region identifier gold standard images. The first loss function refers to a loss function corresponding to a region identifier task in the neural network model. For example, as shown in FIG. 7, a first loss function 751 may be determined based on the region identifier task result 731 and a region identifier task gold standard 741 (i.e., the at least one region identifier gold standard image).

In some embodiments, the first loss function corresponding to the region identifier task may be any loss function suitable for a segmentation task, e.g., a Dice loss, a cross entropy loss, or the like, or any combination thereof.

In some embodiments, the first loss function may be the Dice loss, which may be determined according to the following equation:

$$\text{Loss}_{Dice} = 1 - \frac{2|P \cap Q|}{|P| + |Q|}, \tag{6}$$

where $\text{Loss}_{Dice}$ denotes the first loss function; P denotes the gold standard images used for supervising training (i.e., the at least one region identifier gold standard image); and Q denotes a predicted image output by the neural network model (i.e., the at least one predicted region identifier probability map).

In some embodiments, the region identifier task may include one or more channel outputs, and an output probability map may include at least one of a probability map corresponding to a probability of the cerebral cortex, a probability map corresponding to a probability of the background, etc. Therefore, the first loss function may include one or more Dice losses, and each channel may correspond to one Dice loss.

In 620, a value of a second loss function may be determined based on the at least one predicted landmark identifier probability map and the at least one landmark identifier gold standard image.

In some embodiments, the value of the second loss function may be determined based on the at least one predicted landmark identifier probability map and the at least one landmark identifier gold standard image. The second loss function refers to a loss function corresponding to a landmark identifier task in the neural network model. For example, as shown in FIG. 7, a second loss function 752 may be determined based on the landmark identifier task result 732 and a landmark identifier task gold standard 742 (i.e., the at least one landmark identifier gold standard image).

In 630, a value of a third loss function may be determined based on the at least one predicted plane identifier probability map and the at least one plane identifier gold standard image.

In some embodiments, the value of the third loss function may be determined based on the at least one predicted plane identifier probability map and the at least one plane identifier gold standard image. The third loss function refers to a loss function corresponding to a plane identifier task in the neural network model. For example, as shown in FIG. 7, a third loss function 753 may be determined based on the plane identifier task result 733 and a plane identifier task gold standard 743 (i.e., the at least one plane identifier gold standard image).

In some embodiments, the loss function corresponding to the landmark identifier task and the loss function corresponding to the plane identifier task may be any loss function of point detection based on heatmap regression, e.g., mean square error (MSE) loss, or the like. In some embodiments, the plane identifier task may be regarded as localization of all points on a plane.

In some embodiments, the second loss function and the third loss function may be the MSE Loss, which may be determined according to the following equation:

$$\text{Loss}_{MSE} = \frac{\sum_{i=1}^{n}(x_i - y_i)^2}{n}, \tag{7}$$

where $\text{Loss}_{MSE}$ denotes the second loss function or the third loss function; $x_i$ denotes a probability value of an i-th pixel point in a gold standard image x; $y_i$ denotes a predicted probability value of an i-th pixel point in a predicted probability map y; and n denotes a total count of pixel points included in the gold standard image x and the predicted probability map y.

In some embodiments, a plurality of points (e.g., the AC landmark and the PC landmark) may be included in the landmark identifier task. Therefore, the second loss function may include a plurality of MSE losses, and each point may correspond to one MSE loss.

In some embodiments, the plane identifier task may include one plane (e.g., the MSP), and the third loss function may include one MSE loss.

In 640, a value of a target loss function may be determined by performing weighted summation on the value of the first loss function, the value of the second loss function, and the value of the third loss function.

In some embodiments, after the above operations, the value of the target loss function may be obtained by performing the weighted summation on the value of the first loss function, the value of the second loss function, and the value of the third loss function. For example, as shown in FIG. 7, a target loss function 760 may be obtained based on a first loss function 751, a second loss function 752, and a third loss function 753.

In some embodiments, when the weighted summation is performed, a weight of each loss function of each identifier task may be set to a fixed value through experience. Alternatively, an uncertainty of the output result of the neural network model may be evaluated. The higher the uncertainty of the output result of a branch, the larger the weight of the loss function of the branch may be set.

In some embodiments, the value of the target loss function may be determined according to the following equation:

$$\text{Loss}_{all} = w_1 * \text{Loss}_{Dice,cortex} + w_2 * (\text{Loss}_{MSE,AC} + \text{Loss}_{MSE,PC}) + w_3 * \text{Loss}_{MSE,MSP}, \tag{8}$$

where $\text{Loss}_{all}$ denotes the target loss function (i.e., a total loss function); $\text{Loss}_{Dice,cortex}$ denotes a loss function corresponding to the probability of the cerebral cortex in the region identifier task (i.e., the first loss function), the region identifier task only including one channel corresponding to the probability of the cerebral cortex; $\text{Loss}_{MSE,AC}$ and $\text{Loss}_{MSE,PC}$ respectively denote the loss functions for locating the AC landmark and the PC landmark in the landmark identifier task, and a sum of the loss functions $\text{Loss}_{MSE,AC}$ and $\text{Loss}_{MSE,PC}$ may be the second loss function; $\text{Loss}_{MSE,MSP}$ denotes the third loss function (i.e., the loss function for locating the MSP in the plane identifier task); and $w_1$, $w_2$, and $w_3$ denote weights of the three loss functions, respectively. Values of the three weights may be randomly selected based on situation(s) of the neural network model, or determined based on an experience value, or adjusted based on actual situation(s). For example, in order to balance a difference in an order of magnitude between the Dice loss and the MSE loss, the three weights may be 0.1, 0.9, and 0.9, respectively.

In the Equation (8), one channel of the output image corresponding to the region identifier task (the probability of the cerebral cortex) is considered. If another channel of the output image (the probability of the background) corresponding to the region identifier task also needs to be considered, the value of the target loss function may be determined according to the following equation:

$$\text{Loss}_{all} = w_1 * \text{Loss}_{Dice,cortex} + \text{Loss}_{Dice,Background}) + w_2 *$$
$$(\text{Loss}_{MSE,AC} + \text{Loss}_{MSE,PC}) + w_3 * \text{Loss}_{MSE,MSP}. \qquad (9)$$

Where $\text{Loss}_{Dice,cortex}$ and $\text{Loss}_{Dice,Background}$ respectively denote the loss function corresponding to the probability of the cerebral cortex and the loss function corresponding to the probability of the background in the region identifier task, and remaining part of Equation (9) may be the same as Equation (8).

It should be noted that the descriptions of the processes 300, 500, and 600 are provided for the purposes of illustration, and are not intended to limit the scope of the present disclosure. For persons having ordinary skills in the art, various variations and modifications may be conducted under the teaching of the present disclosure. However, those variations and modifications may not depart from the protection of the present disclosure. For example, the order of operations 610, 620, and 630 is not intended to be limiting.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for brain identifier localization, comprising a processor configured to direct the system to perform operations including:

obtaining an image of a brain;

determining at least one region identifier probability map of the brain, at least one landmark identifier probability map of the brain, and at least one plane identifier probability map of the brain based on the image and a neural network model, wherein a value of each pixel point in the at least one region identifier probability map represents a probability value that the pixel point belongs to at least one region identifier of the brain, a value of each pixel point in the at least one landmark identifier probability map represents a probability value that the pixel point belongs to at least one landmark identifier of the brain, and a value of each pixel point in the at least one plane identifier probability map represents a probability value that the pixel point belongs to at least one plane identifier of the brain;

determining a segmentation result of a cerebral cortex of the brain, the at least one landmark identifier of the brain, and the at least one plane identifier of the brain, respectively, based on the at least one region identifier probability map, the at least one landmark identifier probability map, and the at least one plane identifier probability map;

constructing a target coordinate system based on the at least one landmark identifier and the at least one plane identifier; and determining at least one landmark of the cerebral cortex based on at least one of the segmentation result of the cerebral cortex, the target coordinate system, and the at least one landmark identifier.

2. The system of claim 1, wherein the at least one landmark identifier probability map includes an anterior commissure (AC) probability map and a posterior commissure (PC) probability map, and the at least one landmark identifier includes an AC landmark and a PC landmark.

3. The system of claim 1, wherein the determining a segmentation result of a cerebral cortex of the brain, the at least one landmark identifier of the brain, and the at least one plane identifier of the brain, respectively, based on the at least one region identifier probability map, the at least one landmark identifier probability map, and the at least one plane identifier probability map includes:

for each of the at least one landmark identifier probability map of the brain, determining a position of a pixel point corresponding to a maximum probability value in the landmark identifier probability map as a position of a landmark identifier of the at least one landmark identifier.

4. The system of claim 1, wherein the at least one plane identifier probability map includes a midsagittal plane (MSP) probability map, and the at least one plane identifier includes an MSP.

5. The system of claim 1, wherein the determining a segmentation result of a cerebral cortex of the brain, the at least one landmark identifier of the brain, and the at least one plane identifier of the brain, respectively, based on the at least one region identifier probability map, the at least one landmark identifier probability map, and the at least one plane identifier probability map includes:

for each of the at least one plane identifier of the brain, determining a target point set based on the plane identifier probability map; and obtaining the plane identifier by fitting the target point set.

6. The system of claim 5, wherein for each of the at least one plane identifier of the brain, the determining a target point set based on the plane identifier probability map includes:

determining a set of pixel points in the plane probability map as the target point set, a probability of each of the set of pixel points being larger than a preset threshold.

7. The system of claim 5, wherein for each of the at least one plane identifier of the brain, the obtaining the plane identifier by fitting the target point set includes:

obtaining the plane identifier by fitting, based on a random sampling consensus (RANSAC) algorithm, the target point set.

8. The system of claim 7, wherein the RANSAC algorithm includes:

performing multiple loops of the following operations:

a) determining a subset by randomly sampling the target point set;

b) obtaining a plane by fitting points in the subset; and c) determining a sum of squares of distances between the plane and remaining points of the target point set except the subset; and determining a plane corresponding to one loop with a minimum sum of squares of distances among the multiple loops as the plane identifier.

9. The system of claim 1, wherein the at least one landmark of the cerebral cortex includes at least one of a frontmost point of the cerebral cortex, a rearmost point of the cerebral cortex, a leftmost point of the cerebral cortex, a rightmost point of the cerebral cortex, an inferior point of the cerebral cortex, and superior point of the cerebral cortex.

10. The system of claim 1, wherein the determining at least one landmark of the cerebral cortex based on at least one of the segmentation result of the cerebral cortex, the target coordinate system, and the at least one landmark identifier includes:

determining the at least one landmark of the cerebral cortex based on a maximum point or a minimum point of the cerebral cortex along one direction of three coordinate axes of the target coordinate system; or determining a maximum point or a minimum point of the cerebral cortex that passes through the at least one landmark identifier and is parallel to one direction of three coordinate axes of the target coordinate system as the at least one landmark of the cerebral cortex.

11. The system of claim 1, wherein the neural network model is a multi-task model including a shared network layer and three branch network layers, and the three branch network layers include a first branch network layer, a second branch network layer, and a third branch network layer.

12. The system of claim 11, wherein the first branch network layer is configured to segment the brain, and output the at least one region identifier probability map.

13. The system of claim 11, wherein the second branch network layer is configured to locate the at least one landmark identifier of the brain, and output the at least one landmark identifier probability map.

14. The system of claim 11, wherein the third branch network layer is configured to locate the at least one plane identifier of the brain, and output the at least one plane identifier probability map.

15. The system of claim 11, wherein the neural network model is generated through a training process including:

obtaining training sample images and gold standard images corresponding to each of the training sample images, the gold standard images corresponding to each of the training sample images including at least one region identifier gold standard image, at least one landmark identifier gold standard image, and at least one plane identifier gold standard image corresponding to the training sample image;

for each of the training sample images, obtaining at least one predicted region identifier probability map output by the first branch network layer, at least one predicted landmark identifier probability map output by the second branch network layer, and at least one predicted plane identifier probability map output by the third branch network layer, respectively, by inputting the training sample image into an initial neural network model;

determining a value of a target loss function based on the at least one predicted region identifier probability, the at least one predicted landmark identifier probability map, the at least one predicted plane identifier probability map, the at least one region identifier gold standard image, the at least one landmark identifier gold standard image, and the at least one plane identifier gold standard image; and obtaining a trained neural network model by adjusting parameters of the initial neural network model based on the value of the target loss function corresponding to each of the training sample images.

16. The system of claim 15, wherein for each of the training sample images, the determining a value of a target loss function based on the at least one predicted region identifier probability, the at least one predicted landmark identifier probability map, the at least one predicted plane identifier probability map, the at least one region identifier gold standard image, the at least one landmark identifier gold standard image, and the at least one plane identifier gold standard image includes:

determining a value of a first loss function based on the at least one predicted region identifier probability map and the at least one region identifier gold standard image;

determining a value of a second loss function based on the at least one predicted landmark identifier probability map and the at least one landmark identifier gold standard image;

determining a value of a third loss function based on the at least one predicted plane identifier probability map and the at least one plane identifier gold standard image; and determining the value of the target loss function by performing weighted summation on the value of the first loss function, the value of the second loss function, and the value of the third loss function.

17. The system of claim 1, wherein the image includes a magnetic resonance imaging (MRI) image.

18. A method for brain identifier localization, implemented on a computing device having at least one processor and at least one storage device, the method comprising:

obtaining an image of a brain;

determining at least one region identifier probability map of the brain, at least one landmark identifier probability map of the brain, and at least one plane identifier probability map of the brain based on the image and a neural network model, wherein a value of each pixel point in the at least one region identifier probability map represents a probability value that the pixel point belongs to at least one region identifier of the brain, a value of each pixel point in the at least one landmark identifier probability map represents a probability value that the pixel point belongs to at least one landmark identifier of the brain, and a value of each pixel point in the at least one plane identifier probability map represents a probability value that the pixel point belongs to at least one plane identifier of the brain;

determining a segmentation result of a cerebral cortex of the brain, the at least one landmark identifier of the brain, and the at least one plane identifier of the brain, respectively, based on the at least one region identifier probability map, the at least one landmark identifier probability map, and the at least one plane identifier probability map;

constructing a target coordinate system based on the at least one landmark identifier and the at least one plane identifier; and determining at least one landmark of the cerebral cortex based on at least one of the segmentation result of the cerebral cortex, the target coordinate system, and the at least one landmark identifier.

19. The method of claim 18, wherein:

the neural network model is a multi-task model including a shared network layer and three branch network layers, and the three branch network layers include a first branch network layer, a second branch network layer and a third branch network layer;

the first branch network layer is configured to segment the brain, and output the at least one region identifier probability map;

the second branch network layer is configured to locate the at least one landmark identifier of the brain, and output the at least one landmark identifier probability map; and the third branch network layer is configured to locate the at least one plane identifier of the brain, and output the at least one plane identifier probability map.

20. A non-transitory computer-readable medium, comprising executable instructions that, when executed by at least one processor, direct the at least one processor to perform a method, the method comprising:

obtaining an image of a brain;

determining at least one region identifier probability map of the brain, at least one landmark identifier probability map of the brain, and at least one plane identifier probability map of the brain based on the image and a neural network model, wherein a value of each pixel point in the at least one region identifier probability map represents a probability value that the pixel point belongs to at least one region identifier of the brain, a value of each pixel point in the at least one landmark identifier probability map represents a probability value that the pixel point belongs to at least one landmark identifier of the brain, and a value of each pixel point in the at least one plane identifier probability map represents a probability value that the pixel point belongs to at least one plane identifier of the brain;

determining a segmentation result of a cerebral cortex of the brain, the at least one landmark identifier of the brain, and the at least one plane identifier of the brain, respectively, based on the at least one region identifier probability map, the at least one landmark identifier probability map, and the at least one plane identifier probability map;

constructing a target coordinate system based on the at least one landmark identifier and the at least one plane identifier; and determining at least one landmark of the cerebral cortex based on at least one of the segmentation result of the cerebral cortex, the target coordinate system, and the at least one landmark identifier.

* * * * *